United States Patent
Kim et al.

(10) Patent No.: US 12,482,862 B2
(45) Date of Patent: Nov. 25, 2025

(54) Ni BASED LITHIUM-ION SECONDARY BATTERY COMPRISING A FLUORINATED ELECTROLYTE

(71) Applicants: UMICORE, Brussels (BE); SYENSQO SA, Brussels (BE)

(72) Inventors: JiHye Kim, Cheonan (KR); Jens Paulsen, Cheonan (KR); AReum Park, Cheonan (KR); Dae-Hyun Kim, Cheonan (KR); Hee-Sung Gil, Cheonan (KR); Jean-Sébastien Bridel, Cheonan (KR); Ji-Hye Won, Brussels (BE); Moon-Hyung Choi, Brussels (BE); Mi-Soon Oh, Brussels (BE); Hyuncheol Lee, Brussels (BE); Lawrence Alan Hough, Brussels (BE); Hae-Young Kim, Brussels (BE)

(73) Assignees: UMICORE, Brussels (BE); SYENSQO SA, Brussels (BE)

( * ) Notice: Subject to any disclaimer, the term of this patent is extended or adjusted under 35 U.S.C. 154(b) by 813 days.

(21) Appl. No.: 17/051,294

(22) PCT Filed: May 2, 2019

(86) PCT No.: PCT/EP2019/061195
§ 371 (c)(1),
(2) Date: Oct. 28, 2020

(87) PCT Pub. No.: WO2019/211357
PCT Pub. Date: Nov. 7, 2019

(65) Prior Publication Data
US 2021/0234200 A1    Jul. 29, 2021

(30) Foreign Application Priority Data
May 4, 2018 (EP) .................................. 18170729

(51) Int. Cl.
*H01M 10/0568* (2010.01)
*H01M 10/0525* (2010.01)
*H01M 10/0569* (2010.01)

(52) U.S. Cl.
CPC ... *H01M 10/0568* (2013.01); *H01M 10/0525* (2013.01); *H01M 10/0569* (2013.01); *H01M 2300/0034* (2013.01)

(58) Field of Classification Search
CPC ................................................ H01M 10/0525
See application file for complete search history.

(56) References Cited

U.S. PATENT DOCUMENTS

| 3,907,834 A | 9/1975 | Milberger et al. |
| 5,437,775 A | 8/1995 | Dittrich et al. |
| (Continued) | | |

FOREIGN PATENT DOCUMENTS

| CN | 106133958 A | 11/2016 |
| CN | 106537664 A | 3/2017 |
| (Continued) | | |

OTHER PUBLICATIONS

Yano, Akira, et al., "LiCoO 2 Degradation Behavior in the High-Voltage Phase Transition Region and Improved Reversibility with Surface Coating", Journal of The Electrochemical Society, 2017, vol. 164, No. 18 pages.
(Continued)

*Primary Examiner* — Barbara L Gilliam
*Assistant Examiner* — Jordan E Berresford
(74) *Attorney, Agent, or Firm* — Rimon P.C.; Allyn B. Elliott

(57) ABSTRACT

A liquid electrolyte lithium secondary battery cell comprising: —a positive electrode material comprising a lithium transition metal-based oxide powder having a general formula $Li_{1+a}((Ni_z(Ni_{0.5}Mn_{0.5})_y Co_x)_{1-k}A_k)_{1-a}O_2$, wherein A (Continued)

is a dopant, $-0.025 \leq a \leq 0.025$, $0.18 \leq x \leq 0.22$, $0.42 \leq z \leq 0.52$, $1.075 < z/y < 1.625$, $x+y+z=1$ and $k \leq 0.01$; and—an electrolyte composition comprising: a) at least one cyclic carbonate, b) at least one fluorinated acyclic carboxylic acid ester, c) at least one electrolyte salt, d) at least one lithium compound selected from lithium phosphate compounds, lithium boron compounds, lithium sulfonate compounds and mixtures thereof, e) at least one cyclic sulfur compound, and f) optionally at least one cyclic carboxylic acid anhydride.

9 Claims, 11 Drawing Sheets

(56) References Cited

U.S. PATENT DOCUMENTS

| | | | |
|---|---|---|---|
| 5,866,093 | A | 2/1999 | Belt et al. |
| 6,753,111 | B2 | 6/2004 | Kweon et al. |
| 2007/0196740 | A1* | 8/2007 | Haruna ............ H01M 10/0567 |
| | | | 429/341 |
| 2012/0231351 | A1 | 9/2012 | Jung et al. |
| 2014/0302402 | A1 | 10/2014 | Chen et al. |
| 2015/0010824 | A1 | 1/2015 | Sun et al. |
| 2015/0140443 | A1 | 5/2015 | Takahashi et al. |
| 2015/0311511 | A1* | 10/2015 | Okato .................... H01M 4/26 |
| | | | 429/223 |
| 2016/0359199 | A1* | 12/2016 | Galiano ............ H01M 10/0567 |
| 2016/0365571 | A1 | 12/2016 | Kim et al. |
| 2017/0117586 | A1 | 4/2017 | Dubois et al. |
| 2017/0309909 | A1* | 10/2017 | Paulsen ................ C01G 53/006 |
| 2021/0399287 | A1 | 12/2021 | Xia et al. |

FOREIGN PATENT DOCUMENTS

| | | |
|---|---|---|
| CN | 107210422 A | 9/2017 |
| EP | 2858164 A1 | 4/2015 |
| EP | 3111494 A1 | 1/2017 |
| JP | 2007165297 A | 6/2007 |
| JP | 2017506805 A | 3/2017 |
| KR | 20120102375 A | 9/2012 |
| KR | 20150138326 A | 12/2015 |
| KR | 20160130415 A | 11/2016 |
| KR | 20170009873 A | 1/2017 |
| KR | 20170118091 A | 10/2017 |
| WO | 2009040367 A1 | 4/2009 |
| WO | 2012107313 A1 | 8/2012 |
| WO | 2013183655 A1 | 12/2013 |
| WO | 2014056936 A1 | 4/2014 |
| WO | 2015128722 A1 | 9/2015 |
| WO | 2015179210 A1 | 11/2015 |
| WO | 2016116862 A1 | 7/2016 |
| WO | 2017042654 A1 | 3/2017 |
| WO | 2018050652 A1 | 3/2018 |

OTHER PUBLICATIONS

Akyol, Muratahan, et al., "High-throughput computational design of cathode coatings for Li-ion batteries", Nature Communications, 7, Article No. 13779, 2016, 12 pages.

International Search Report and Written Opinion for International Patent Application No. PCT/EP2019/061195 dated Aug. 7, 2019, 10 pages.

WIPO; International Preliminary Report on Patentability for International Patent Application No. PCT/EP2019/061195 dated Jun. 24, 2020, 8 pages.

Kim, Duho et al., "Design of Nickel-rich Layered Oxides Using d Electronic Donor for Redox Reactions", Chemistry of Materials, vol. 27, No. 18, Sep. 2015, 7 pages.

Korean Intellectual Property Office: Office Action in corresponding Korean Patent Application No. 10-2020-7034918, mailed Aug. 26, 2024, 8 pages.

Korean Intellectual Property Office: Office Action in corresponding Korean Patent Application No. 10-2020-7034918, mailed Aug. 26, 2024, English Translation, 7 pages.

* cited by examiner

Ni BASED LITHIUM-ION SECONDARY BATTERY COMPRISING A FLUORINATED ELECTROLYTE

CROSS-REFERENCE TO RELATED APPLICATIONS

This application is a U.S. National Stage application of International Patent Application No. PCT/EP2019/061195, filed on May 2, 2019, which claims the benefit of European Patent Application No. 18170729.0, filed on May 4, 2018.

TECHNICAL FIELD AND BACKGROUND

This invention relates to a battery comprising a high Ni-excess "NMC" cathode material having a particular cathode material composition and a selected electrolyte composition. By "NMC" we refer to lithium nickel manganese cobalt oxide. The high Ni-excess NMC powder can be preferably used as a cathode active material in rechargeable lithium-ion batteries.

Batteries containing the cathode material combined with the electrolyte composition of the invention show excellent performance, such as high reversible capacity, improved thermal stability during high temperature storage, and good long-term cycle stability when cycled at a high charge voltage.

Lithium-ion battery technology is currently the most promising energy storage means for both electro-mobility and stationary power stations. $LiCoO_2$ (doped or not—hereafter referred to as "LCO"), which previously was the most commonly used as a cathode material, has a good performance but is expensive. In addition, since cobalt resources are gradually depleted, lithium nickel cobalt aluminum oxide or lithium nickel manganese cobalt oxide (hereafter referred to as "NCA" and "NMC" respectively—note that both can be doped) have become prospective candidates of replacing LCO. These materials have a high reversible capacity, a relatively high volumetric energy density, good rate capability, long-term cycle stability, and low cost.

NMC cathode materials can (approximatively) be understood as a solid state solution of $LiCoO_2$, $LiNi_{0.5}Mn_{0.5}O_2$ and $LiNiO_2$, corresponding to the general formula $Li_{1+a}[Ni_z(Ni_{0.5}Mn_{0.5})_yCo_x]_{1-a}O_2$, where "z" stands for the so-called Ni-excess, as is defined below, as Ni is 100% divalent ($Ni^{2+}$) in $LiNi_{0.5}Mn_{0.5}O_2$ and Ni is 100% trivalent ($Ni^{3+}$) in $LiNiO_2$. At 4.3 V the nominal capacity of $LiCoO_2$ and $LiNi_{0.5}Mn_{0.5}O_2$ is about 160 mAh/g, against 220 mAh/g for that of $LiNiO_2$. Typical NMC based materials are expressed as $LiM'O_2$, where $M'=Ni_xMn_yCo_z$, and can be referred to as "111" material with $M'=Ni_{1/3}Mn_{1/3}Co_{1/3}$, "442" with $M'=Ni_{0.4}Mn_{0.4}Co_{0.2}$, "532" with $M'=Ni_{0.5}Mn_{0.3}Co_{0.2}$, or "622" with $M'=Ni_{0.6}Mn_{0.2}Co_{0.2}$. M' can be doped with dopants "A" such as Al, Ca, Ti, Mg, W, Zr, B, and Si, resulting in the formula $Li_{1-a}((Ni_z(Ni_{0.5}Mn_{0.5})_yCo_x)_{1-k}A_k)_{1+a}O_2$.

The reversible capacity of (undoped) NMC cathode materials can be roughly estimated from these capacities. For example, NMC 622 is comprehended as 0.2 $LiCoO_2$+0.4 $LiNi_{0.5}Mn_{0.5}O_2$+0.4 $LiNiO_2$. The expected capacity equals 0.2×160+0.4×160+0.4×220=184 mAh/g. The capacity increases with "Ni-excess". For example, the Ni-excess is 0.4 in NMC 622. If we assume lithium stoichiometry with Li/(Ni+Mn+Co)=1.0, then "Ni-excess" is the fraction of 3-valent Ni. FIG. 1 shows the expected capacities as a function of Ni-excess. Here, the x-axis is the Ni-excess ("z") and the y-axis is the calculated reversible capacity.

Additionally, the price of Ni and Mn is much lower than that of Co. Therefore, the cost of the cathode per unit of delivered energy is greatly reduced by using Ni and Mn instead of Co. According to '2020 cathode materials cost competition for large scale applications and promising LFP best-in-class performer in term of price per kWh' announced at the OREBA 1.0 conference on May 27, 2014, the metal price per cathode capacity of LCO is 35 $/kWh, while for NMC 111 it is 22 $/kWh. As the Ni content of NMC increases, the metal price per cathode capacity also increases because the Ni price is higher than the Mn price, but it does not reach the cost of LCO. Therefore, Ni-excess NMC with higher energy density and lower process cost—by contrast to LCO—is more preferred in today's battery market.

Large-scale manufacturing of NMC demands that it is easy to prepare and produce high-quality cathode materials. As the Ni-excess in the cathode materials is increased—which is desired from a capacity point of view—the production becomes more difficult. As an example—very high Ni-excess cathode materials like NCA—$LiNi_{0.8}Co_{0.15}Al_{0.5}O_2$ cannot be prepared in air or using $Li_2CO_3$ as a lithium source. If $Li_2CO_3$ is used as a lithium precursor, the carbonate needs to decompose and $CO_2$ is released into the gas phase. However, the $CO_2$ equilibrium partial pressures of very high Ni-excess cathode materials are very small. Thus, the gas phase transport of $CO_2$ limits the reaction kinetics and the $CO_3$ decomposition occurs very slowly—even in pure oxygen. Furthermore, very high Ni-excess cathodes have low thermodynamic stability. A fully reacted and fully lithiated very high Ni-excess cathode will even decompose when heated in normal air. The $CO_2$ partial pressure of air is high enough so that the $CO_2$ extracts lithium from the crystal structure and forms $Li_2CO_3$. Therefore $CO_2$ free gas, typically oxygen, is required during the production of very high Ni-excess cathodes. This causes higher production cost. Additionally, as the use of $Li_2CO_3$ is not possible as the lithium source, lithium precursors like $Li_2O$, $LiOH \cdot H_2O$ or LiOH need to be applied instead of the cheaper $Li_2CO_3$, which increases production cost further. In addition, the transition metal precursors—for example mixed transition metal hydroxide—need to be free of carbonate.

Finally, when using lithium hydroxide ($LiOH \cdot H_2O$ or LiOH), the low melting point of lithium hydroxide is a point of concern. Whereas $Li_2CO_3$ tends to react before melting, lithium hydroxide tends to melt before reacting. This causes many unwanted effects during a mass production process, like inhomogeneity of products, impregnation of the ceramic saggers with molten LiOH, and etc. In addition, during the manufacturing of high Ni-excess NMC, Ni ions tend to migrate into the Li site which severely limits the actual capacity, so it is difficult to have an appropriate stoichiometry. This problem also affects the reversibility of the intercalation mechanism, leading to capacity fading.

It can be summarized that the increased capacity of the very high Ni-excess cathode materials like NCA comes at a significant production cost.

Another issue of very high Ni-excess cathodes is the content of soluble base. The concept of "soluble base" is explicitly discussed in e.g. WO2012-107313: the soluble base refers to surface impurities like $Li_2CO_3$ and LiOH. Because of the low thermodynamic stability of Li in Ni-excess cathode materials, remaining carbonate decomposes very slowly or $CO_2$ being present in the air is easily adsorbed and forms $Li_2CO_3$ on the surface of cathodes. Additionally, in the presence of water or moisture, Li is easily extracted from the bulk, resulting in formation of LiOH. Thus, undesired "soluble bases" occur easily on the surface of very high Ni-excess cathodes like NCA.

In the case of very high Ni-excess, there are many possible sources of carbonate impurity. Specifically, the soluble bases can originate from the mixed transition metal hydroxides that are used as the transition metal source in the production. The mixed transition metal hydroxide is usually obtained by co-precipitation of transition metal sulfates and an industrial grade base such as sodium hydroxide (NaOH). Thus, the hydroxide can contain a $CO_3^{2-}$ impurity. During sintering with the lithium source, the residual $CO_3^{2-}$ reacts with lithium and creates $Li_2CO_3$. As $LiM'O_2$ crystallites grow during sintering, the $Li_2CO_3$ base will be accumulated on the surface of these crystallites. Thus, after sintering at high temperature in a high Ni-excess NMC, like NMC 622, carbonate compounds remain on the surface of the final product. This base can dissolve in water, and therefore the soluble base content can be measured by a technique called pH titration, as discussed in U.S. Pat. No. 7,648,693.

Soluble bases, in particular residual $Li_2CO_3$, are a major concern since they are the cause of poor cycle stability in lithium ion batteries. Also, it is not clear if very high Ni-excess is sustainable during large-scale preparation, because materials used as precursors are air sensitive. Therefore, the preparation of very high Ni-excess cathode materials is performed in $CO_2$ free oxidizing gas (typically $O_2$) to reduce the soluble base content at increasing temperature. $LiOH \cdot H_2O$ is also used as the lithium source instead of $Li_2CO_3$ to reduce the soluble base content. A typical process to prepare high Ni-excess NMC using $LiOH \cdot H_2O$ is for example applied in US2015/0010824. $LiOH \cdot H_2O$ with a low $Li_2CO_3$ impurity as the lithium source is blended with the mixed transition metal hydroxide at the target composition, and sintered at high temperature under an air atmosphere. In this process, the base content of high Ni-excess NMC final product (like NMC 622) is much reduced.

There are two major trends to achieve a high energy density with Ni-excess in NMC. One trend is to increase the Ni-excess up to very high values in order to achieve high capacities at normal change voltage. The second trend is to increase the charge voltage in order to achieve high capacities with less Ni-excess.

NCA, for example, has a very high Ni-excess of around 0.8 as all Ni is 3-valent. In NC91 ($LiNi_{0.9}Co_{0.1}O_2$), the Ni-excess is even 0.9. These cathode materials have very high capacities even at relatively low charge voltage. As an example—NC91 has a capacity as high as 220 mAh/g at 4.3V in a coin cell testing with lithium as a counter electrode. As discussed before, it is difficult to produce such cathode materials in a mass production process at reasonable cost. Additionally, we observe the issue of poor safety.

The safety issue of charged batteries is a general concern. The safety is related to a process called thermal runaway. Due to exothermic reaction, the battery heats up and the reaction rate inside the battery increases, causing the battery to explode by thermal runaway. The thermal runaway is mostly caused by electrolyte combustion. If the battery is fully charged and the cathodes are in the delithiated state, the values of "x" in the resulting $Li_{1-x}M'O_2$ are high. These highly delithiated cathodes are very unsafe when in contact with electrolyte. The delithiated cathode is an oxidizer and can react with the electrolyte which acts as the reducing agent. This reaction is very exothermic and causes thermal runaway. In the ultimate case, the battery will explode. In a simple way, it can be explained that the electrolyte is combusted using the oxygen which is available from the delithiated cathode. Once a certain temperature in the battery has been reached the cathodes decompose and deliver oxygen which combusts the electrolyte. After the reaction—as Ni is stable in the divalent state and there is large Ni-excess—most of the transition metal is 2 valent. Schematically—each mol of cathode can deliver one mol oxygen to combust the electrolyte: $NiO_2$+electrolyte→NiO+combustion products ($H_2O$, $CO_2$).

The other trend to achieve a high energy density is to set the Ni-excess at more intermediate values but to apply a high charge voltage. Typical values for the Ni-excess range from about 0.4 to about 0.6. This region we will be referred as "high Ni-excess". The reversible capacity at 4.2 or 4.3V of high Ni-excess NMC is less than that of "very high" Ni-excess compound (with Ni-excess >0.6). To achieve the same state of charge (i.e. remaining Li in the delithiated cathode) like very high Ni-excess cathode (fx. NCA), a battery with high Ni-excess cathode (fx. NMC622) needs to be charged to a higher voltage. A similar state of charge could, for example, be obtained at 4.2V for NCA and 4.35V using NMC622. Thus, to improve the capacity of "high Ni-excess" NMC, higher charge voltages are applied.

Even at the high charge voltage, the resulting delithiated high Ni-excess cathodes are safer than the delithiated very high Ni-excess cathodes mentioned above at lower voltage. Whereas Ni based cathodes tend to form NiO during the oxygen combustion reaction, Ni-M' tends to form more stable $M'_3O_4$ compounds during the delithiation process. These compounds have a higher final oxygen stoichiometry thus less oxygen is available to combust the electrolyte. A schematic example for a cathode without Ni-excess is $LiMn_{0.5}Ni_{0.5}O_2$→$Mn_{0.5}Ni_{0.5}O_2$+electrolyte→0.5 $NiMnO_3$+combustion products ($H_2O$, $CO_2$). In this case, 0.5 oxygen is available to combust the electrolyte as only 50% of the transition metal is divalent after the combustion reaction. This is different from the case of very high Ni-excess cathodes discussed above, where almost 1 mol is available.

In principle, the $2^{nd}$ trend could be extended towards still less Ni-excess cathodes. Cathode materials with only a small Ni-excess could be charged to still higher voltages. As an example, NMC532 could be charged to about 4.45V or NMC442 to about 4.55V to achieve a similar capacity. In this case—due to the lower content of Ni the safety of the delithiated cathodes is expected to improve further and also the production process is simplified. However, this approach was not feasible as known electrolytes were not working well at these very high charge voltages, and thus, a poor cycle stability was observed.

The current invention refers to the $2^{nd}$ trend, applying higher charge voltages to cathode materials not having very high (>0.6) but only high Ni-excess (0.4-0.6). As both the Ni content and the charge voltage increase, it is difficult to obtain good safety and a cheap preparation process. From the prior art it is thus known that high Ni-excess materials have many issues for a successful preparation and application in Li ion batteries. Therefore, to make high Ni-excess materials acceptable, it is necessary to provide such cathode materials having optimized NMC compositions and enhanced battery performances, where a high reversible capacity is achieved together with good cycle stability and safety.

Another issue of high Ni-excess cathodes used at high voltage (4.3 to 4.4 V) is the reaction with electrolyte during the cycling of the battery. The metallic element from the cathode material will dissolve in the electrolyte and this will result in a decrease of active material and a decrease of capacity.

Moreover, the main issues of the known electrolyte compositions for batteries with a NMC cathode material are their poor performances in terms of reversible capacity, storage stability due to their high sensitivity to temperature changes and cycle performance at high voltage (4.3 to 4.4 V). Moreover, decomposition of components of such electrolyte compositions at high voltage is a safety issue since the generation of gas induced can lead to the explosion of the battery.

Therefore, there is a need for improving the performances and the safety of Ni-based lithium-ion secondary batteries at high voltage (4.3 to 4.4 V), especially those comprising NMC cathode material having high Ni-excess.

SUMMARY

Viewed from a first aspect, the invention can provide a liquid electrolyte rechargeable battery comprising a positive electrode material and an electrolyte composition, the positive electrode material comprising a lithium transition metal-based oxide powder having a general formula $Li_{1+a}((Ni_z(Ni_{0.5}Mn_{0.5})_y Co_x)_{1-k} A_k)_{1-a} O_2$, wherein A is a dopant, with $-0.025 \leq a \leq 0.025$, $0.18 \leq x \leq 0.22$, $0.42 \leq z \leq 0.52$, $1.075 < z/y < 1.625$, $x+y+z=1$ and $k \leq 0.01$ and the electrolyte composition comprising:
  a) at least one cyclic carbonate,
  b) at least one fluorinated acyclic carboxylic acid ester,
  c) at least one electrolyte salt,
  d) at least one lithium compound selected from lithium phosphates compounds, lithium boron compounds, lithium sulfonates compounds and mixtures thereof,
  e) at least one cyclic sulfur compound, and
  f) optionally at least one cyclic carboxylic acid anhydride.

The term "electrolyte composition" as used herein, refers to a chemical composition suitable for use as an electrolyte in a rechargeable battery, especially a liquid electrolyte lithium secondary battery cell.

The term "electrolyte salt" as used herein, refers to an ionic salt that is at least partially soluble in the electrolyte composition and that at least partially dissociates into ions in the electrolyte composition to form a conductive electrolyte composition.

The term "cyclic carbonate" as used herein refers specifically to an organic carbonate, wherein the organic carbonate is a dialkyl diester derivative of carbonic acid, the organic carbonate having a general formula R'OC(O)OR", wherein R' and R" form a cyclic structure via interconnected atoms and are each independently selected from alkyl groups having at least one carbon atom, wherein R' and R" can be the same or different, branched or unbranched, saturated or unsaturated, substituted or unsubstituted.

Particular examples of branched or unbranched alkyl groups that can be used in accordance with the invention include methyl, ethyl, n-propyl, isopropyl, n-butyl, isobutyl, tert-butyl.

The term "fluorinated acyclic carboxylic acid ester" refers to a dialkyl carboxylic acid ester wherein the alkyl groups do not form a cyclic structure via interconnected atoms and wherein at least one hydrogen atom in the structure is substituted by fluorine. The alkyl groups are independently selected from alkyl groups having at least one carbon atom, they can be the same or different, branched or unbranched, saturated or unsaturated.

More generally, the term "fluorinated" in connection with any organic compound mentioned hereinafter means that at least one hydrogen is replaced by fluorine. The term "fluoroalkyl, fluoroalkenyl and fluoroalkynyl groups" refers to alkyl, alkenyl and alkynyl groups wherein at least one hydrogen is replaced by fluorine respectively.

The term "lithium phosphate compound" refers to a compound having both lithium and a phosphate group in the empirical formula. The lithium and phosphate group are not necessarily bonded directly to one another, but are present in the same compound.

The term "lithium boron compound" refers to a compound having both lithium and boron, preferably borate group, in the empirical formula. The lithium and boron or borate group are not necessarily bonded directly to one another, but are present in the same compound.

The term "lithium sulfonate compound" refers to a compound having both lithium and a sulfonate group in the empirical formula. The lithium and sulfonate group are not necessarily bonded directly to one another, but are present in the same compound.

The term "cyclic sulfur compound" commonly refers to an organic cyclic sulfate or sultone, being a dialkyl (di)ester derivative of sulphuric acid or sulfonic acid, wherein the alkyl groups form a cyclic structure via interconnected atoms and are each independently selected from alkyl groups having at least one carbon atom, that can be the same or different, branched or unbranched, saturated or unsaturated, substituted or unsubstituted.

The term "cyclic carboxylic acid anhydride" refers to an organic compound derived from a carboxylic acid wherein two acyl groups are bonded to an oxygen atom according to the general formula $R_e C(O)—O—C(O)R_f$ and wherein $R_e$ and $R_f$ form a cyclic structure via interconnected atoms and are each independently selected from alkyl groups having at least one carbon atom, wherein $R_e$ and $R_f$ can be the same or different, branched or unbranched, saturated or unsaturated, substituted or unsubstituted.

In the following description, the expression "ranging from . . . to . . . " "between . . . and . . . " should be understood has including the limits.

Different embodiments that may be combined may provide the following features:
  the lithium transition metal-based oxide powder has a carbon content ≤1000 ppm;
  the lithium transition metal-based oxide powder has a carbon content ≤5400 ppm;
  the lithium transition metal-based oxide powder has a sulfur content between 0.05 and 1.0 wt %;
  the lithium transition metal-based oxide powder has a sulfur content between 0.1 and 0.3 wt %;
  the powder further comprises between 0.15 and 5 wt % of a $LiNaSO_4$ secondary phase; and here it may be that the powder consists of a core comprising the lithium transition metal-based oxide and a coating comprising the $LiNaSO_4$ secondary phase. It may also be that the secondary phase further comprises up to 1 wt % of either one or more of $Al_2O_3$, $LiAlO_2$, $LiF$, $Li_3PO_4$, $MgO$ and $Li_2TiO_3$;
  the dopant A is either one or more of Al, Ca, W, B, Si, Ti, Mg and Zr.
  the powder consists of a core comprising the lithium transition metal-based oxide and a surface layer comprising lithium and transition metals, the surface layer being delimited by an outer and an inner interface, the inner interface being in contact with the core, wherein A is at least one dopant and comprises Al, wherein the core has an Al content of 0.3-3 mol %, and wherein the surface layer has an Al content that increases from the Al content of the core at the inner interface to at least 10 mol % at the outer interface, the Al content being determined by XPS. In this embodiment it may be that the surface layer consists of an intimate mixture of the transition metals of the core Ni, Co and Mn; and $Al_2O_3$, and either one or more compounds from the group consisting of LiF, CaO, $TiO_2$, MgO, $WO_3$, $ZrO_2$, $Cr_2O_3$ and $V_2O_5$;

said at least one cyclic carbonate in the electrolyte composition is of formula (I) or (II):

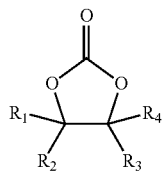

(I)

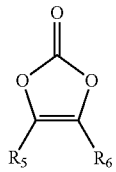

(II)

wherein $R_1$ to $R_6$, which may be the same or different, are independently selected from hydrogen, fluorine, a C1 to C8 alkyl group, a C1 to C8 alkenyl group, a C1 to C8 alkynyl group, a C1 to C8 fluoroalkyl group, a C1 to C8 fluoroalkenyl group, or a C1 to C8 fluoroalkynyl group;

said at least one cyclic carbonate in the electrolyte composition is a "non-fluorinated" cyclic carbonate of formula (I) or (II) above, wherein, $R_1$ to $R_6$, which may be the same or different, are independently selected from hydrogen, a C1 to C8 alkyl group, a C1 to C8 alkenyl group, or a C1 to C8 alkynyl group;

said at least one cyclic carbonate in the electrolyte composition is a "fluorinated" cyclic carbonate of formula (I) or (II) above wherein at least one of $R_1$ to $R_6$ is fluorine, a C1 to C8 fluoroalkyl group, a C1 to C8 fluoroalkenyl group, or a C1 to C8 fluoroalkynyl group;

the composition comprises at least two cyclic carbonates, preferably both of formula (I), at least one being a "non-fluorinated" cyclic carbonate and at least one being a "fluorinated" cyclic carbonate as defined above;

said fluorinated acyclic carboxylic acid ester in the electrolyte formulation is of formula:

$R^1$—COO—$R^2$ wherein
i) $R^1$ is hydrogen, an alkyl group or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

said at least one electrolyte salt in the electrolyte composition is a lithium salt, preferably selected from lithium hexafluorophosphate ($LiPF_6$), lithium bis(trifluromethyl)tetrafluorophosphate ($LiPF_4(CF_3)_2$), lithium bis(pentafluoroethyl)tetrafluorophosphate ($LiPF_4(C_2F_5)_2$), lithium tris(pentafluoroethyl)trifluorophosphate ($LiPF_3(C_2F_5)_3$), lithium bis(trifluoromethanesulfonyl)imide ($LiN(CF_3SO_2)_2$), lithium bis(perfluoroethanesulfonyl)imide $LiN(C_2F_5SO_2)_2$, $LiN(C_2F_5SO_3)_2$, lithium (fluorosulfonyl) (nonafluorobutanesulfonyl)imide, lithium bis(fluorosulfonyl)imide, lithium tetrafluoroborate, lithium perchlorate, lithium hexafluoroarsenate, lithium hexafluoroantimonate, lithium tetrachloroaluminate, lithium aluminate (LiAlO4), lithium trifluoromethanesulfonate, lithium nonafluorobutanesulfonate, lithium tris(trifluoromethanesulfonyl)methide, lithium bis(oxalato)borate, lithium difluoro (oxalato)borate, $Li_2B_{12}F_{12-x}H_x$ where x is an integer equal to 0 to 8, mixtures of lithium fluoride and anion receptors such as $B(OC_6F_5)_3$ and mixtures thereof;

said at least one lithium compound in the electrolyte composition is selected from:
  i) lithium phosphate compounds selected from lithium monofluorophosphate, lithium difluorophosphate, lithium trifluoromethane phosphate, lithium tetrafluoro phosphate, lithium difluorobis(oxalato) phosphate, lithium tetrafluoro(oxalato)phosphate, lithium tris(oxalato)phosphate,
  ii) lithium boron compounds selected from lithium tetrafluoroborate, lithium bis(oxalato)borate, lithium difluoro(oxalato)borate, $Li_2B_{12}F_{12-x}H_x$ wherein x is an integer ranging from 0 to 8,
  iii) lithium sulfonate compounds selected from lithium fluorosulfonate, lithium trifluoromethanesulfonate,
  iv) and mixtures thereof, being preferably selected from lithium difluorophosphate, lithium bis(oxalato)borate and mixtures thereof;

said at least one cyclic sulfur compound in the electrolyte composition is represented by the formula:

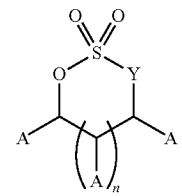

wherein Y is oxygen or an HCA group, wherein each A is independently hydrogen or an optionally fluorinated ethenyl, allyl, ethynyl, propargyl, or $C_1$-$C_3$ alkyl group; and n is 0 or 1;

said at least one cyclic carboxylic acid anhydride is represented by one of the formulas (IV) through (XI):

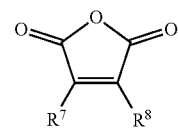

IV

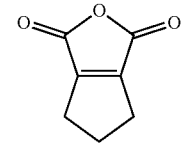

V

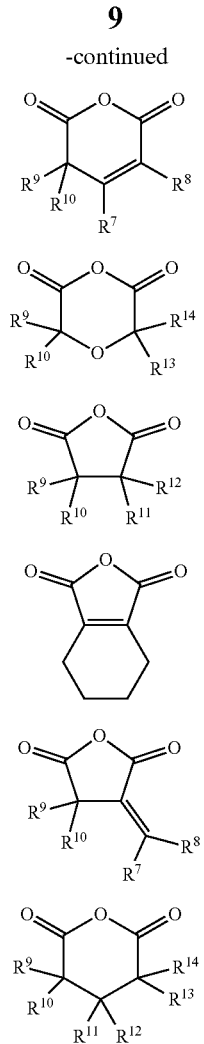

wherein $R^7$ to $R^{14}$ is each independently hydrogen, fluorine, a linear or branched $C_1$ to $C_{10}$ alkyl group optionally substituted with fluorine, alkoxy, and/or thioalkyl substituents, a linear or branched $C_2$ to $C_{10}$ alkenyl group, or a $C_6$ to $C_{10}$ aryl group.

This invention discloses a liquid electrolyte rechargeable battery with high Ni-excess NMC materials which have an optimized cathode material composition in a narrow range together with an electrolyte composition specifically optimized for operating with such Ni-excess NMC materials, resulting in enhanced battery performances, such as excellent high capacity, long cycle stability, and thermal stability. These cathode materials can be produced by a competitive process.

BRIEF DESCRIPTION OF THE FIGURES

FIG. 5b. Exploded view of FIG. 5a

DETAILED DESCRIPTION

The invention focuses on the synergistic combination of a specific electrolyte composition with specific lithium transition metal oxides used as a cathode material in rechargeable lithium batteries. The cathode materials have the NMC composition which is $LiM'O_2$ with M' being one or more transition metals selected from Ni, Mn, and Co; but M' may also be doped with other elements. The cathode materials of the invention have a specific range of compositions which allows to achieve an optimum performance.

Figure 1:
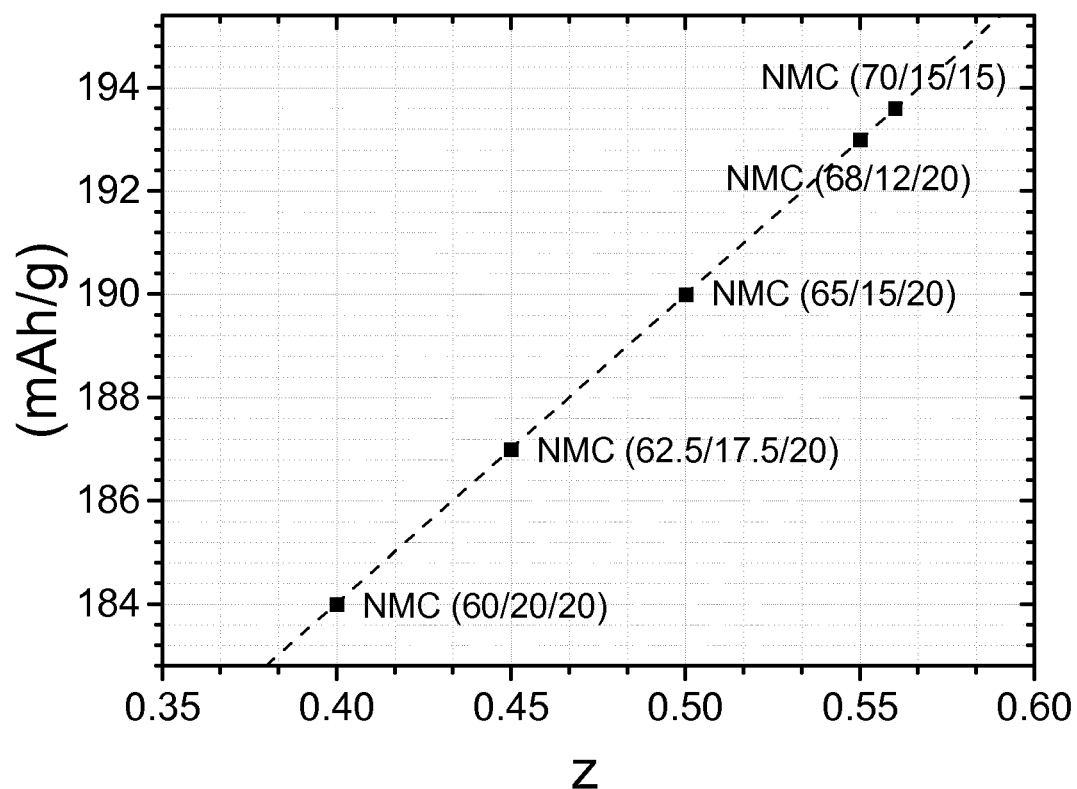
FIG. 1. Calculated reversible capacity of NMC materials as function of Ni-excess FIG. 2. Specific composition range in a ternary Ni—Mn—Co composition triangle FIG. 3. Contour plot of initial discharge capacities of NMC compounds in coin cell testing method 1
Figure 2:
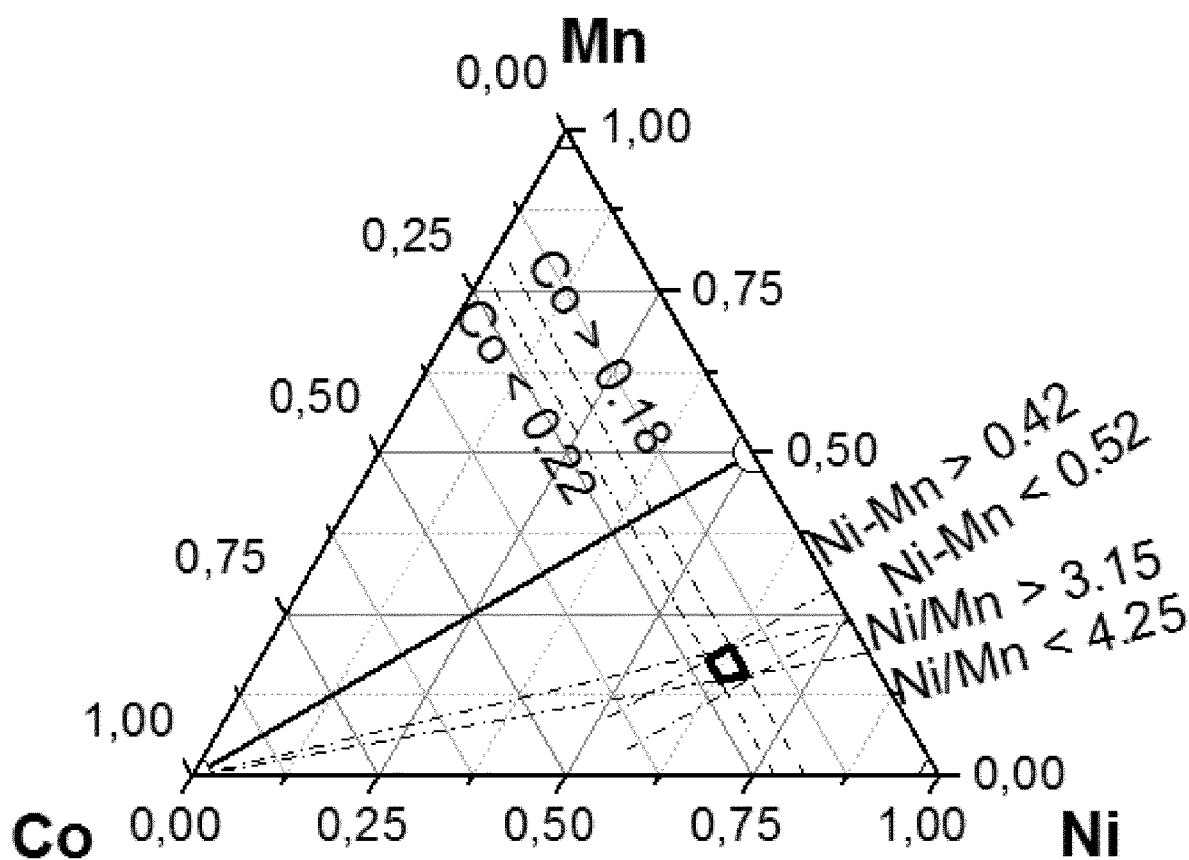

Particularly, a high reversible capacity is achieved together with good cycle stability and safety. The improved performance is obtained if the Co content is ranging from 0.18 to 0.22 and Ni and Mn vary within a small range. This Ni—Mn range can be expressed by 2 relations which are related to each other: Ni—Mn and Ni/Mn. The molar ratio of Ni/Mn, expressed by $(1+(2*z))/y$, can also affect the performance such as capacity and cycle stability, as described in "Ionics, 20, 1361-1366 (2014)". With the increase of the ratio of Ni/Mn, the total discharge capacity increases, but when the ratio becomes too high, the stability of the electrode material decreases. When on the other hand the Mn content increases versus the Ni content, the capacity decreases. As the Ni content increases both the Ni excess "z" (=Ni minus Mn) as well as the Ni to Mn stoichiometric ratio increases. An improved performance is obtained if the Ni-excess ranges from 0.42 to 0.52 and if the Ni to Mn stoichiometric ratio is ranging from 3.15 to 4.25. FIG. 2 shows this specific composition range in a ternary Ni—Mn—Co composition triangle. The preferred stoichiometric region is within the pentagon with Ni—Mn—Co corners of (1) 0.615/0.195/0.189, (2) 0.622/0.198/0.180, (3) 0.664/0.156/0.18, (4) 0.631/0.149/0.22, (5) 0.60/0.18/0.22.

Typically cathode materials disclosed in this invention are manufactured by a multiple sintering method using a mixed transition metal precursor like mixed metal hydroxide $M'(OH)_2$, oxyhydroxide M'OOH, or an intermediate $M'O_a(OH)_{2-a}$ (with M'=Ni, Mn, and Co; and 0<a<1). In the following description the term "M'-hydroxide" encompasses these different precursor compositions. M'-hydroxide is typically prepared by a precipitation process. Feed(s) of a metal containing acid solution is fed into a stirred reactor. At the same time, feed(s) of base is added to the reactor. Furthermore, additives such as ammonia or oxalate are fed into the reactor to better control the particle growth. The metal acid that is usually used is a transition metal sulfate solution and the typical base is NaOH. Thus, a precipitation reaction "$M'SO_4+2NaOH\rightarrow M'(OH)_2+Na_2SO_4$" takes place. Many precipitation device designs are possible. A continuously stirred tank reactor (CSTR) process provides a continuous process which both supplies the feed solution and collects the overflow continuously.

Alternatively, the design can be a batch-process where the precipitation is stopped after the reactor is filled. It can also be the combination of batch and thickening processes where more precipitate accumulates in the reactor, because liquid (after sedimentation or filtering) is removed but the majority of solid remains in the reactor during the process. In this way, the feed of M'SO$_4$ and NaOH into the reactor can continue for a longer time.

During the precipitation reaction conditions like RPM of stirrer, pH of the tank, flow rates and flow rate ratios, residence time and temperature etc. are kept well controlled to obtain a high quality mixed transition metal hydroxide product. After precipitation the obtained mixed transition metal hydroxide is filtered, washed and dried. Thus, the mixed transition metal hydroxide is achieved. The mixed transition precursor will be the precursor for the sintering process that follows.

As the mixed transition metal precursors may be prepared by a precipitation method, the target transition metal composition M' in the precipitated M'-hydroxide has a Co content of 0.18 to 0.22 mol and it contains a Ni-excess (=Ni—Mn) of 0.42 to 0.52. Furthermore the Ni to Mn ratio is between 3.15 to 4.25. The transition metal composition can thus be written as $Ni_z(Ni_{0.5}Mn_{0.5})_yCo_x$ where $0.42 \leq z \leq 0.52$, $0.18 \leq x \leq 0.22$ and $3.15 < (2*z/y)+1 < 4.25$.

The cathode materials of the invention can be prepared by a cost efficient sintering process. The sintering is performed in an oxygen containing gas. Contrary to cathode materials with very high Ni-excess cathode materials which require to be prepared in a $CO_2$ free atmosphere like pure $O_2$, the cathode materials of the current invention can be sintered in air, which allows to decrease the cost of the preparation process. Typically, the cathode materials are prepared by a multiple sintering approach. If a double sintering is applied, the $1^{st}$ sintering process delivers a product having a Li/M' stoichiometric ratio which is less than 1. And the $2^{nd}$ sintering process delivers the fully lithiated product which has a Li/M' stoichiometric ratio near to unity. Such a process is disclosed in WO2017-042654.

In the $1^{st}$ sintering step, the mixed transition metal precursor is blended with a lithium source. Typically LiOH·H$_2$O or Li$_2$CO$_3$ is used as a lithium source. The use of Li$_2$CO$_3$ is possible and allows to reduce preparation cost, with the exception that Li$_2$CO$_3$ cannot be used if the Ni-excess is too high. The blend is sintered in oxygen containing gas (for example, in a flow of air) to obtain a lithium deficient intermediate material. A typical sintering temperature is higher than 650° C. but less than 950° C. The intermediate material has a Li/M' stoichiometric ratio less than unity, typically ranging from 0.7 to 0.95.

In the $2^{nd}$ sintering process, the lithium deficient intermediate from the $1^{st}$ sintering step is mixed with LiOH·H$_2$O in order to obtain the final Li/M' target composition. The target ratio is near to the stoichiometric Li/M'=1.00 value. The blend is sintered in oxygen containing gas (for example, in a flow of air or oxygen) to obtain the final cathode material. A typical sintering temperature is higher than 800° C. but less than 880° C. Typically post processing steps (milling, sieving, etc.) follow after sintering. Instead of applying a 2 step sintering process, cathode materials can be also prepared by other suitable processes. The conventional single step sintering is a possible alternative. If single sintering is applied a typical Li source is LiOH·H$_2$O.

The resulting cathode material has a good crystal structure and it has a low soluble base content. Especially, the content of soluble carbonate base is low. Typical values for carbon content (being present as soluble carbonate) range from 150 ppm to about 1000 ppm, but preferably not exceeding 400 ppm. If the carbon content is too high, less capacity is obtained and the cycle stability deteriorates. Additionally bulging properties deteriorate. Bulging is an unwanted property where battery volumes increase due to gas evolution within the batteries when charged pouch cells are exposed to heat. Finally, the cathode may contain sulfur. At least 0.05%, preferably at least 0.1% of sulfur by mass may be present. The presence of sulfur improves the cycle stability and increase reversible capacity. Our results indicate that sulfur is important to optimize grain boundaries in polycrystalline cathode materials. If the sulfur content is much less then grain boundaries are very tight and the reversible capacity deteriorates. The content of sulfur should not exceed 1% by mass otherwise reversible capacity is lost.

After the $2^{nd}$ sintering process, the obtained material can be used as cathode material in rechargeable lithium ion batteries. The performance of cathodes with this particular composition can be further enhanced by surface treatments, thereby allowing to increase the charging voltage without deteriorating performance, and thus allow to achieve a higher energy density. The surface treatment stabilizes the surface against undesirable reactions that happen in batteries during cycling or storage, and might also be efficient to prevent the cracking of particles during extended cycling because this would trigger new surface-enhancing undesired side reactions. The change of Li content in the cathode during charge-discharge causes volume changes which create strain. Surface coatings may contribute to reduce the strain on the surface and crack-nucleation is delayed. The mechanism is well described in 'Journal of The Electrochemical Society, 164, A6116-A6122 (2017)'. In a typical surface treatment approach, all the surfaces or parts of the surfaces are covered by suitable chemicals. Currently, Al and Zr based compounds are popular, however many chemicals can be used for surface treatment, some of them are listed in 'Nature Communications, 7, 13779 (2016)'. The application of the chemical is done by wet or dry processing. Usually, the amount of chemicals for surface treatment is low, being in the range of 1% by mass or less. In this invention surface coating methods have been used that apply Al and/or LiF, or LiNaSO$_4$ to the surface. These methods have been described in U.S. Pat. No. 6,753,111, WO2016-116862, and EP3111494 Al. Other surface treatment methods are known which apply Mg, B, P, etc.—containing chemicals.

If the Ni-excess is larger than 0.52, a surface treatment is less efficient to improve performance. If the Ni-excess is less than 0.42, then surface treatment improves the performance, but the capacity becomes insufficient. The combination of a surface treatment and proper Ni-excess is synergetic.

Generally, after applying the chemicals to the surface a heat treatment follows. Typical heat treatment temperatures are (a) 100-250° C.: if the process is a classical coating process involving melting or drying;

(b) 300-450° C.: if surface reactions are desired but the bulk should not react and (c) 600-800° C.: if certain solid state diffusion or bulk reactions are involved.

Examples of this invention may apply (1) an Al based coating followed by a heat treatment in the temperature range of (c); or (2) an Al and LiF based coating or an Al and LiNaSO$_4$ based coating using the temperature range of (b).

The present invention observes that only a narrow compositional range allows to obtain high capacity and at the same time a good cycle stability and safety. If the composition deviates from this optimum region then deterioration of cycle stability is observed. Within the optimum region, a sufficient high capacity can be achieved by applying a relatively high charge voltage. The cathode material within this narrow optimized region is particularly suitable to be used in large batteries or in batteries which apply a charge voltage exceeding 4.15V. It typically shows a good performance at 4.3 V or even at 4.35 V and at high temperature. Also, cathode materials with optimized compositions show much better safety properties and cycle stability compared to very high Ni-excess NMC such as NMC 811 or NC 91.

If the composition deviates even slightly from the values given above, the performance worsens. If the Ni-excess is lower, the capacity at fixed voltage decreases as well, and a higher charge voltage needs to be applied to achieve the target capacity. As this voltage is too high, a poor cycle stability is observed. If the Co content is higher, the cost of the cathode increases and the capacity at fixed voltage decreases. If the Co content is lower, structural instability during cycling is observed. The structural instability manifests itself by a worse cycle stability compared to reference. It is surprising that such instability—which is more typical for very high Ni-excess cathodes—is observed for medium high Ni-excess cathodes with less Co content. The authors conclude that accurate Co concentration control is critical in the cathode materials to achieve a good performance. If the Ni-excess is higher, the preparation difficulties increase. Also, the capacity obtained from fixed voltage is lower than expected, and when charged at higher voltage to obtain the targeted capacity, a lower performance is obtained. Particularly, the safety deteriorates and the cycle stability is lower compared to the target composition.

The lithium to metal ratio of the cathode material is near to unity: $Li_{1+a}M'_{1-a}O_2$ with "a" being near to zero. If the lithium concentration is higher, then the soluble base content increases and the capacity deteriorates. If the lithium concentration is less the capacity deteriorates. The authors conclude that the control of the lithium to transition metal stoichiometric ratio within about the 0.95-1.05 range is critical to obtain to achieve a good performance.

The conclusion is the following: if the composition is different from the optimum composition, the overall performance worsens. Particularly:

if the Co is larger than 0.22 the capacity deteriorates if the Co is less than 0.18 the cycle stability deteriorates if the Ni-excess is less than 0.42 the capacity is insufficient if the Ni-excess is larger than 0.52 the cycle stability and safety properties deteriorate if the ratio of Ni/Mn (=(z+(0.5*y))/0.5*y) is larger than 4.25, the cycle stability deteriorates, if the ratio of Ni/Mn is less than 3.15, the capacity deteriorates, if the Li/M' stoichiometric ratio largely exceeds 1.05 the capacity deteriorates and the content of soluble base becomes too high, and if the Li/M' stoichiometric ratio is much less than 0.95 the capacity and cycle stability deteriorate.

The electrolyte composition to be used in a battery according to the present invention will now be described with reference to the following preferred embodiments. It will be understood that the invention is not limited to these preferred embodiments.

Said electrolyte composition comprises at least one cyclic carbonate. In one embodiment, said at least one cyclic carbonate is of formula (I) or (II):

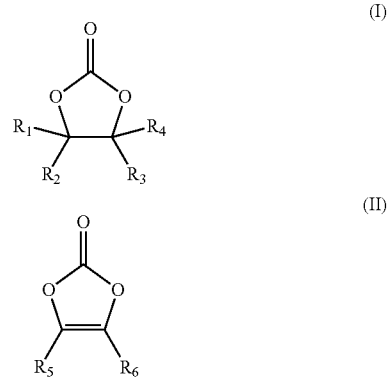

wherein $R_1$ to $R_6$, which may be the same or different, are independently selected from hydrogen, fluorine, a C1 to C8 alkyl group, a C1 to C8 alkenyl group, a C1 to C8 alkynyl group, a C1 to C8 fluoroalkyl group, a C1 to C8 fluoroalkenyl group, or a C1 to C8 fluoroalkynyl group.

Preferably, $R_1$ to $R_6$ are independently selected from hydrogen, fluorine, a C1 to C3 alkyl group, a C1 to C3 alkenyl group, a C1 to C3 alkynyl group, a C1 to C3 fluoroalkyl group, a C1 to C3 fluoroalkenyl group, or a C1 to C3 fluoroalkynyl group.

More preferably, $R_1$ and $R_5$ are independently selected from fluorine or a C1 to C3 alkyl group, said C1 to C3 alkyl group being preferably a methyl group, and $R_2$, $R_3$ $R_4$ $R_6$ are as defined above.

Even more preferably, $R_1$ and $R_5$ are independently selected from fluorine or a methyl group and $R_2$, $R_3$ $R_4$ $R_6$ are respectively hydrogen.

In a sub-embodiment, said at least one cyclic carbonate is of formula (I) above.

In a sub-embodiment, said at least one cyclic carbonate is of formula (II) above.

In a sub-embodiment, at least two cyclic carbonates of formula (I) or (II) are present in the electrolyte composition.

In one embodiment, said at least one cyclic carbonate is a "non-fluorinated" cyclic carbonate. In that respect the non-fluorinated cyclic carbonate can be of the above formula (I) or (II) wherein, $R_1$ to $R_6$, which may be the same or different, are independently selected from hydrogen, a C1 to C8 alkyl group, a C1 to C8 alkenyl group, or a C1 to C8 alkynyl group.

Preferably, when the electrolyte composition according to the invention comprises a non-fluorinated cyclic carbonate of formula (I) or (II), $R_1$ to $R_6$ are independently selected from hydrogen, a C1 to C3 alkyl group, a C1 to C3 alkenyl group, or a C1 to C3 alkynyl group.

More preferably, when the electrolyte composition according to the invention comprises a non-fluorinated cyclic carbonate of formula (I) or (II), $R_1$ and $R_5$ are independently selected from hydrogen or a C1 to C3 alkyl group, said C1 to C3 alkyl group being preferably a methyl group, and $R_2$, $R_3$, $R_4$, $R_6$ are independently selected from hydrogen, a C1 to C3 alkyl group or a vinyl group.

Even more preferably, when the electrolyte composition according to the invention comprises a non-fluorinated cyclic carbonate of formula (I) or (II), $R_1$ and $R_5$ are independently a methyl group and $R_2$, $R_3$, $R_4$, R are respectively hydrogen.

In a preferred sub-embodiment, said at least one cyclic carbonate is a non-fluorinated cyclic carbonate of formula (I) as defined above.

In another preferred sub-embodiment, the electrolyte composition according to the invention comprises at least two cyclic carbonates, preferably both of formula (I), at least one of the two being a non-fluorinated cyclic carbonate as defined above.

The non-fluorinated cyclic carbonate can be especially selected from ethylene carbonate, propylene carbonate, vinylene carbonate, ethyl propyl vinylene carbonate, vinyl ethylene carbonate, dimethylvinylene carbonate, and mixtures thereof. More preferably, it is selected from ethylene carbonate, propylene carbonate, vinyl ethylene carbonate, and mixtures thereof. Propylene carbonate is particularly preferred.

Non-fluorinated cyclic carbonates are commercially available (e.g. from Sigma-Aldrich) or can be prepared using methods known in the art. It is desirable to purify the non-fluorinated cyclic carbonate to a purity level of at least about 99.0%, for example at least about 99.9%. Purification can be done using methods known in the art. For example, propylene carbonate can be synthesized with a high purity according to the method described in U.S. Pat. No. 5,437,775.

Said at least one cyclic carbonate, being preferably a non-fluorinated cyclic carbonate as defined above, can be present in the electrolyte composition in an amount ranging from 5% to 50%, preferably from 10% to 45%, more preferably from 12% to 40%, more preferably from 15% to 35%, even more preferably from 17% to 30%, by weight relative to the total weight of the electrolyte composition.

In an alternative embodiment, said at least one cyclic carbonate is a "fluorinated" cyclic carbonate. In that respect, the fluorinated cyclic carbonate can be of the above formula (I) or (II), wherein at least one of $R_1$ to $R_6$ is fluorine, a C1 to C8 fluoroalkyl group, a C1 to C8 fluoroalkenyl group, or a C1 to C8 fluoroalkynyl group.

Preferably, when the electrolyte composition according to the invention comprises a fluorinated cyclic carbonate of formula (I) or (II), at least one of $R_1$ to $R_6$ is fluorine, a C1 to C3 fluoroalkyl group, a C1 to C3 fluoroalkenyl group, or a C1 to C3 fluoroalkynyl group.

More preferably, when the electrolyte composition according to the invention comprises a fluorinated cyclic carbonate of formula (I) or (II), $R_1$ and $R_5$ are independently fluorine and $R_2$, $R_3$, $R_4$, $R_6$ are independently selected from hydrogen, fluorine or a C1 to C3 alkyl group being preferably a methyl group.

Even more preferably, when the electrolyte composition according to the invention comprises a fluorinated cyclic carbonate of formula (I) or (II), $R_1$ and $R_5$ are independently fluorine and $R_2$, $R_3$, $R_4$, $R_6$ are respectively hydrogen.

In a preferred sub-embodiment, said at least one cyclic carbonate is a fluorinated cyclic carbonate of formula (I) as defined above.

The fluorinated cyclic carbonate can be especially selected from 4-fluoro-1,3-dioxolan-2-one; 4-fluoro-4-methyl-1,3-dioxolan-2-one; 4-fluoro-5-methyl-1,3-dioxolan-2-one; 4-fluoro-4,5-dimethyl-1,3-dioxolan-2-one; 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; 4,4,5,5-tetrafluoro-1,3-dioxolan-2-one; and mixtures thereof; being preferably 4-fluoro-1,3-dioxolan-2-one.

Fluorinated cyclic carbonates are commercially available (4-fluoro-1,3-dioxolan-2-one especially can be obtained from Solvay) or can be prepared using methods known in the art, for instance such as described in WO2014056936. It is desirable to purify the fluorinated cyclic carbonate to a purity level of at least about 99.0%, for example at least about 99.9%. Purification can be done using methods known in the art.

In another alternative embodiment, the composition comprises at least two cyclic carbonates.

Preferably, when at least two cyclic carbonates are present in the electrolyte composition according to the invention, at least one is a non-fluorinated cyclic carbonate and at least one is a fluorinated cyclic carbonate as described above.

The fluorinated cyclic carbonate can be present in the electrolyte composition in an amount ranging from 0.5% to 20%, preferably from 0.8% to 15%, more preferably from 1% to 10%, more preferably from 2% to 10%, even more preferably from 3% to 10%, by weight relative to the total weight of the electrolyte composition.

The electrolyte composition according to the present invention also comprises at least a fluorinated acyclic carboxylic acid ester. According to an embodiment, the fluorinated acyclic carboxylic acid ester is of formula:

wherein
i) $R^1$ is hydrogen, an alkyl group or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

In a sub-embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

In a sub-embodiment, $R^1$ is hydrogen and $R^2$ is a fluoroalkyl group.

In a sub-embodiment, $R^1$ is an alkyl group and $R^2$ is a fluoroalkyl group.

In a sub-embodiment, $R^1$ is a fluoroalkyl group and $R^2$ is an alkyl group.

In a sub-embodiment, $R^1$ is a fluoroalkyl group and $R^2$ is a fluoroalkyl group, and $R^1$ and $R^2$ can be either the same as or different from each other.

Preferably, the number of carbon atoms in $R^1$ is 1 to 5, preferably 1 to 3, still preferably 1 or 2, even more preferably 1.

Preferably, the number of carbon atoms in $R^2$ is 1 to 5, preferably 1 to 3, still preferably 2.

Preferaby, $R^1$ is hydrogen, a C1 to C3 alkyl group or a C1 to C3 fluoroalkyl group, more preferably a C1 to C3 alkyl group and still preferably a methyl group.

Preferaby, $R^2$ is a C1 to C3 alkyl group or a C1 to C3 fluoroalkyl group, more preferably a C1 to C3 fluoroalkyl group and still preferably a C1 to C3 fluoroalkyl group comprising at least two fluorine atoms.

Preferably, neither $R^1$ nor $R^2$ contain a $FCH_2$— group or a —FCH— group.

Said fluorinated acyclic carboxylic acid ester can especially be selected from the group consisting of 2,2-difluoroethyl acetate, 2,2,2-trifluoroethyl acetate, 2,2-difluoroethyl propionate, 3,3-difluoropropyl acetate, 3,3-difluoropropyl propionate, methyl 3,3-difluoropropanoate, ethyl 3,3-difluoropropanoate, ethyl 4,4-difluorobutanoate, difluoroethyl formate, trifluoroethyl formate, and mixtures thereof, preferably selected from the group consisting of 2,2-difluoroethyl acetate, 2,2-difluoroethyl propionate, 2,2,2-trifluoroethyl acetate, 2,2-difluoroethyl formate and mixtures thereof; being preferably 2,2-difluoroethyl acetate.

Fluorinated acyclic carboxylic acid esters can be purchased from a specialty chemical company or prepared using methods known in the art. For example, 2,2-difluoroethyl acetate can be prepared from acetyl chloride and 2,2-difluoroethanol, with or without a basic catalyst. Additionally, 2,2-difluoroethyl acetate and 2,2-difluoroethyl propionate may be prepared using the method described by Wiesenhofer et al. in WO2009/040367, Example 5. Other fluorinated acyclic carboxylic acid esters may be prepared using the same method using different starting carboxylate salts. Alternatively, some of these fluorinated solvents may be purchased from companies such as Matrix Scientific (Columbia SC).

It is desirable to purify the fluorinated acyclic carboxylic acid ester to a purity level of at least about 99.0%, for example at least about 99.9%. Purification can be done using methods known in the art, in particular distillation methods such as vacuum distillation or spinning band distillation.

The fluorinated acyclic carboxylic acid ester can especially be present in the electrolyte composition in an amount ranging from 5% to 95%, preferably from 10% to 80%, more preferably from 20% to 75%, more preferably from 30% to 70%, even more preferably from 50% to 70%, by weight relative to the total weight of the electrolyte composition.

The electrolyte composition according to the invention also comprises at least one electrolyte salt, being preferably a lithium salt. Suitable electrolyte salts include, without limitation, lithium hexafluorophosphate (LiPF$_6$), lithium bis(trifluromethyl)tetrafluorophosphate (LiPF$_4$(CF$_3$)$_2$), lithium bis(pentafluoroethyl)tetrafluorophosphate (LiPF$_4$(C$_2$F$_5$)$_2$), lithium tris(pentafluoroethyl)trifluorophosphate (LiPF$_3$(C$_2$F$_5$)$_3$), lithium bis(trifluoromethanesulfonyl)imide (LiN(CF$_3$SO$_2$)$_2$), lithium bis(perfluoroethanesulfonyl)imide LiN(C$_2$F$_5$SO$_2$)$_2$, LiN(C$_2$F$_5$SO$_3$)$_2$, lithium (fluorosulfonyl)(nonafluorobutanesulfonyl)imide, lithium bis(fluorosulfonyl)imide, lithium tetrafluoroborate, lithium perchlorate, lithium hexafluoroarsenate, lithium hexafluoroantimonate, lithium tetrachloroaluminate, LiAlO4, lithium trifluoromethanesulfonate, lithium nonafluorobutanesulfonate, lithium tris(trifluoromethanesulfonyl)methide, lithium bis(oxalato)borate, lithium difluoro(oxalato)borate, Li$_2$B$_{12}$F$_{12-x}$H$_x$ where x is an integer equal to 0 to 8, and mixtures of lithium fluoride and anion receptors such as B(OC$_6$F$_5$)$_3$. Mixtures of two or more of these or comparable electrolyte salts may also be used.

The electrolyte salt is preferably selected from lithium hexafluorophosphate, lithium bis(fluorosulfonyl)imide, lithium bis(trifluoromethanesulfonyl)imide and mixtures thereof, more preferably from lithium hexafluorophosphate, lithium bis(fluorosulfonyl)imide and mixtures thereof. The electrolyte salt is most preferably lithium hexafluorophosphate.

The electrolyte salt is usually present in the electrolyte composition in an amount ranging from 5% to 20%, preferably from 6% to 18%, more preferably from 8% to 17%, more preferably from 9% to 16%, even more preferably from 11% to 16%, in weight relative to the total amount of electrolyte composition.

Electrolyte salts are commercially available (they can be purchased from a specialty chemical company such as Sigma-Aldrich or Solvay for lithium bis(trifluoromethanesulfonyl)imide) or can be prepared using methods known in the art.

LiPF$_6$ can for instance be manufactured according to the method described in U.S. Pat. No. 5,866,093. Sulfonylimides salts can be for instance manufactured as described in U.S. Pat. No. 5,072,040. It is desirable to purify the electrolyte salt to a purity level of at least about 99.0%, for example at least about 99.9%. Purification can be done using methods known in the art.

The electrolyte composition according to the invention further comprises at least one additional lithium compound selected from lithium phosphates compounds, lithium boron compounds, lithium sulfonates compounds and mixtures thereof.

According to one embodiment, said lithium compound is selected from lithium phosphates compounds. It can advantageously be selected from lithium monofluorophosphate, lithium difluorophosphate, lithium trifluoromethane phosphate, lithium tetrafluoro phosphate, lithium difluorobis(oxalato)phosphate, lithium tetrafluoro(oxalato)phosphate, lithium tris(oxalato)phosphate and mixtures thereof.

According to a sub-embodiment, said lithium compound is selected from fluorinated lithium phosphates compounds. It can especially be selected from lithium monofluorophosphate, lithium difluorophosphate, lithium trifluoromethane phosphate, lithium tetrafluoro phosphate and mixtures thereof; being preferably lithium difluorophosphate.

According to another sub-embodiment, said lithium compound is selected from lithium oxalato phosphates compounds, eventually from fluorinated oxalato phosphates compounds in particular. It can especially be selected from lithium difluorobis(oxalato)phosphate, lithium tetrafluoro(oxalato)phosphate, lithium tris(oxalato)phosphate and mixtures thereof; more specifically from difluorobis(oxalato)phosphate, lithium tetrafluoro(oxalato)phosphate or mixtures thereof.

According to one embodiment, said lithium compound is selected from lithium boron compounds, eventually from lithium oxalto borates in particular. It can advantageously be selected from lithium bis(oxalato)borate, lithium difluoro (oxalato)borate, lithium tetrafluoroborate, Li$_2$B$_{12}$F$_{12-x}$H$_x$ wherein x is an integer ranging from 0 to 8, and mixtures thereof; more specifically from lithium bis(oxalato)borate, lithium difluoro (oxalato)borate, lithium tetrafluoroborate, and mixtures thereof; being preferably lithium bis(oxalato)borate.

According to one embodiment, said lithium compound is selected from lithium sulfonates. It can advantageously be selected from lithium fluorosulfonate, lithium trifluoromethanesulfonate or mixtures thereof.

According to a particular embodiment, said lithium compound is selected from lithium difluorophosphate, lithium bis(oxalato)borate and mixtures thereof.

Lithium compounds are commercially available (they can be purchased from a specialty chemical company such as Sigma-Aldrich) or can be prepared using methods known in the art. Lithium bis(oxalato)borate can be, for instance, synthesized as described in DE19829030. Lithium difluorophosphate can be for instance synthesized such as described in U.S. Pat. No. 8,889,091. It is desirable to purify the lithium compound to a purity level of at least about 99.0%, for example at least about 99.9%. Purification can be done using methods known in the art.

The lithium compound can be present in the electrolyte composition of the invention in an amount ranging from 0.1% to 5%, preferably from 0.2% to 4%, more preferably from 0.3% to 3%, more preferably from 0.4% to 2%, even more preferably from 0.5% to 1%, in weight relative to the total amount of electrolyte composition.

The electrolyte composition according to the invention further comprises at least one cyclic sulfur compound. According to one embodiment, said cyclic sulfur compound is represented by the formula:

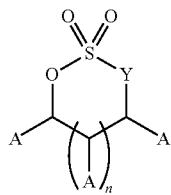

wherein Y is oxygen or denotes a HCA group; wherein each A is independently hydrogen or an optionally fluorinated ethenyl ($H_2C$=CH—), allyl ($H_2C$=CH—$CH_2$—), ethynyl (HC≡C—), propargyl (HC≡C—$CH_2$—), or C1-C3 alkyl group; and n is 0 or 1.

The HCA group denotes a carbon atom that is linked to a hydrogen atom, a A entity as defined above, and adjacent sulfur and carbon atoms of the cyclic sulfur compound.

Each A entity may be unsubstituted or partially or totally fluorinated. Preferably, A is unsubstituted. More preferably, A is hydrogen or a C1-C3 alkyl group. Still more preferably, A is hydrogen.

In a sub-embodiment, Y is oxygen. In an alternative sub-embodiment, Y is $CH_2$.

In a sub-embodiment n is 0. In an alternative sub-embodiment n is 1.

In a particular sub-embodiment, Y is oxygen and n=0. In an alternative particular sub-embodiment, Y is oxygen and n=1.

In a particular sub-embodiment, Y is $CH_2$ and n=0. In an alternative particular sub-embodiment, Y is $CH_2$ and n=1.

Mixtures of two or more of sulfur compounds may also be used.

The cyclic sulfur compound can be especially selected from 1,3,2-dioxathiolane-2,2-dioxide, 1,3,2-dioxathiolane-4-ethynyl-2,2-dioxide, 1,3,2-dioxathiolane-4-ethenyl-2,2-dioxide, 1,3,2-dioxathiolane-4,5-diethenyl-2,2-dioxide, 1,3,2-dioxathiolane-4-methyl-2,2-dioxide, 1,3,2-dioxathiolane-4,5-dimethyl-2,2-dioxide; 1,3,2-dioxathiane-2,2-dioxide, 1,3,2-dioxathiane-4-ethynyl-2,2-dioxide, 1,3,2-dioxathiane-5-ethynyl-2,2-dioxide, 1,3,2-dioxathiane-4-ethenyl-2,2-dioxide, 1,3,2-dioxathiane-5-ethenyl-2,2-dioxide, 1,3,2-dioxathiane-4,5-diethenyl-2,2-dioxide, 1,3,2-dioxathiane-4,6-diethenyl-2,2-dioxide, 1,3,2-dioxathiane-4,5,6-triethenyl-2,2-dioxide, 1,3,2-dioxathiane-4-methyl-2,2-dioxide, 1,3,2-dioxathiane-5-methyl-2,2-dioxide, 1,3,2-dioxathiane-4,5-dimethyl-2,2-dioxide, dioxathiane-4,6-dimethyl-2,2-dioxide, dioxathiane-4,5,6-trimethyl-2,2-dioxide; 1,3-propane sultone, 3-fluoro-1,3-propane sultone, 4-fluoro-1,3-propane sultone, 5-fluoro-1,3-propane sultone, 1,4-butane sultone, 3-fluoro-1,4-butane sultone, 4-fluoro-1,4-butane sultone, 5-fluoro-1,4-butane sultone, 6-fluoro-1,4-butane sultone and mixtures thereof.

In a first sub-embodiment, the cyclic sulfur compound is a cyclic sulfate selected from 1,3,2-dioxathiolane-2,2-dioxide, 1,3,2-dioxathiolane-4-ethynyl-2,2-dioxide, 1,3,2-dioxathiolane-4-ethenyl-2,2-dioxide, 1,3,2-dioxathiolane-4,5-diethenyl-2,2-dioxide, 1,3,2-dioxathiolane-4-methyl-2,2-dioxide, 1,3,2-dioxathiolane-4,5-dimethyl-2,2-dioxide; 1,3,2-dioxathiane-2,2-dioxide, 1,3,2-dioxathiane-4-ethynyl-2,2-dioxide, 1,3,2-dioxathiane-5-ethynyl-2,2-dioxide, 1,3,2-dioxathiane-4-ethenyl-2,2-dioxide, 1,3,2-dioxathiane-5-ethenyl-2,2-dioxide, 1,3,2-dioxathiane-4,5-diethenyl-2,2-dioxide, 1,3,2-dioxathiane-4,6-diethenyl-2,2-dioxide, 1,3,2-dioxathiane-4,5,6-triethenyl-2,2-dioxide, 1,3,2-dioxathiane-4-methyl-2,2-dioxide, 1,3,2-dioxathiane-5-methyl-2,2-dioxide, 1,3,2-dioxathiane-4,5-dimethyl-2,2-dioxide, dioxathiane-4,6-dimethyl-2,2-dioxide, dioxathiane-4,5,6-trimethyl-2,2-dioxide; and mixtures thereof; More particularly, the cyclic sulfate can be selected from 1,3,2-dioxathiolane-2,2-dioxide, 1,3,2-dioxathiolane-4-ethynyl-2,2-dioxide, 1,3,2-dioxathiolane-4-ethenyl-2,2-dioxide, 1,3,2-dioxathiolane-4,5-diethenyl-2,2-dioxide, 1,3,2-dioxathiolane-4-methyl-2,2-dioxide, 1,3,2-dioxathiolane-4,5-dimethyl-2,2-dioxide; and mixtures thereof; being preferably 1,3,2-dioxathiolane-2,2-dioxide.

Alternatively, the cyclic sulfate can be selected from 1,3,2-dioxathiane-2,2-dioxide, 1,3,2-dioxathiane-4-ethynyl-2,2-dioxide, 1,3,2-dioxathiane-5-ethynyl-2,2-dioxide, 1,3,2-dioxathiane-4-ethenyl-2,2-dioxide, 1,3,2-dioxathiane-5-ethenyl-2,2-dioxide, 1,3,2-dioxathiane-4,5-diethenyl-2,2-dioxide, 1,3,2-dioxathiane-4,6-diethenyl-2,2-dioxide, 1,3,2-dioxathiane-4,5,6-triethenyl-2,2-dioxide, 1,3,2-dioxathiane-4-methyl-2,2-dioxide, 1,3,2-dioxathiane-5-methyl-2,2-dioxide, 1,3,2-dioxathiane-4,5-dimethyl-2,2-dioxide, dioxathiane-4,6-dimethyl-2,2-dioxide, dioxathiane-4,5,6-trimethyl-2,2-dioxide; and mixtures thereof; being preferably 1,3,2-dioxathiane-2,2-dioxide.

In a second sub-embodiment, the cyclic sulfur compound is a sultone selected from 1,3-propane sultone, 3-fluoro-1,3-propane sultone, 4-fluoro-1,3-propane sultone, 5-fluoro-1,3-propane sultone, 1,4-butane sultone, 3-fluoro-1,4-butane sultone, 4-fluoro-1,4-butane sultone, 5-fluoro-1,4-butane sultone, 6-fluoro-1,4-butane sultone and mixtures thereof. More particularly, the sultone can be selected from 1,3-propane sultone, 3-fluoro-1,3-propane sultone, 4-fluoro-1,3-propane sultone, 5-fluoro-1,3-propane sultone and mixtures thereof; preferably from 1,3-propane sultone and/or 3-fluoro-1,3-propane sultone; being more preferably 1,3-propane sultone.

Alternatively, the sultone can be selected from 1,4-butane sultone, 3-fluoro-1,4-butane sultone, 4-fluoro-1,4-butane sultone, 5-fluoro-1,4-butane sultone, 6-fluoro-1,4-butane sultone and mixtures thereof; preferably from 1,4-butane sultone and/or 3-fluoro-1,4-butane sultone; being more preferably 1,4-butane sultone.

Cyclic sulfur compounds are commercially available (for instance they can be purchased from a specialty chemical company such as Sigma-Aldrich) or can be prepared using methods known in the art. It is desirable to purify the cyclic sulfur compound to a purity level of at least about 99.0%, for example at least about 99.9%. Purification can be done using methods known in the art.

The cyclic sulfur compound is usually present in the electrolyte composition in an amount ranging from 0.2% to 10%, preferably from 0.3% to 7%, more preferably from 0.4% to 5%, more preferably from 0.5% to 3%, in weight relative to the total amount of electrolyte composition.

The electrolyte composition according to the present invention can advantageously comprise at least one cyclic carboxylic acid anhydride. In an embodiment, the cyclic carboxylic acid anhydride is represented by one of the formulas (IV) through (XI):

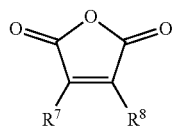

IV

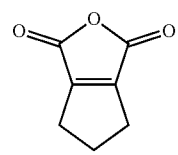

V

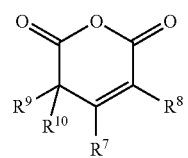

VI

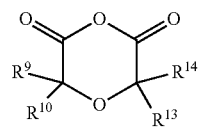

VII

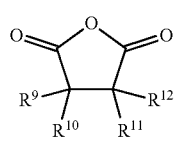

VIII

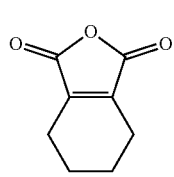

IX

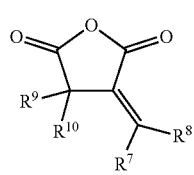

X

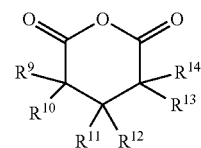

XI wherein $R^7$ to $R^{14}$ is each independently hydrogen, fluorine, a linear or branched C1 to C10 alkyl group optionally substituted with fluorine, an alkoxy, and/or a thioalkyl group, a linear or branched C2 to C10 alkenyl group, or a C6 to C10 aryl group.

The alkoxy group can have from one to ten carbons and can be linear or branched; examples of alkoxy groups include —$OCH_3$, —$OCH_2CH_3$ and —$OCH_2CH_2CH_3$.

The thioalkyl group can have from one to ten carbons and can be linear or branched; examples of thioalkyl substituents include —$SCH_3$, —$SCH_2CH_3$, and —$SCH_2CH_2CH_3$.

In a sub-embodiment, $R^7$ to $R^{14}$ is each independently hydrogen, fluorine or a C1 to C3 alkyl group, being preferably hydrogen.

In a sub-embodiment, said at least one cyclic carboxylic acid anhydride is of formula (IV) above.

Said at least one cyclic carboxylic acid anhydride can be especially selected from maleic anhydride; succinic anhydride; glutaric anhydride; 2,3-dimethylmaleic anhydride; citraconic anhydride; 1-cyclopentene-1,2-dicarboxylic anhydride; 2,3-diphenylmaleic anhydride; 3,4,5,6-tetrahydrophthalic anhydride; 2,3-dihydro-1,4-dithiiono-[2,3-c] furan-5,7-dione; phenylmaleic anhydride; and mixtures thereof.

Preferably, said at least one cyclic carboxylic acid anhydride is selected from maleic anhydride, succinic anhydride, glutaric anhydride, 2,3-dimethylmaleic anhydride, citraconic anhydride, or mixtures thereof.

Still preferably, said at least one cyclic carboxylic acid anhydride is maleic anhydride.

Cyclic carboxylic acid anhydrides can be purchased from a specialty chemical company (such as Sigma-Aldrich) or prepared using methods known in the art. For instance, maleic anhydride can be synthesized as described in U.S. Pat. No. 3,907,834. It is desirable to purify the cyclic carboxylic acid anhydride to a purity level of at least about 99.0%, for example at least about 99.9%. Purification can be done using methods known in the art.

The cyclic carboxylic acid anhydride is usually present in the electrolyte composition in an amount ranging from 0.10% to 5%, preferably from 0.15% to 4%, more preferably from 0.20% to 3%, more preferably from 0.25% to 1%, even more preferably from 0.30% to 0.80%, in weight relative to the total amount of electrolyte composition.

According to one embodiment, the electrolyte composition of the invention consists of a solvent, one or more additives and an electrolyte salt.

The solvent can advantageously consist of at least one, preferably at least two, cyclic carbonate(s) and at least one fluorinated acyclic carboxylic acid ester. In a sub-embodiment, the solvent consists of at least one non-fluorinated cyclic carbonate, at least one fluorinated carbonate and at least one fluorinated acyclic carboxylic acid ester, each being such as described above.

Said additives can advantageously comprise or consist of at least a lithium compound, a cyclic sulfur compound and optionally a cyclic carboxylic acid anhydride, each being such as described above.

The electrolyte salt can advantageously consist of one or more lithium salts, such as described above.

According to one embodiment, the electrolyte composition of the invention comprises at least one, at least two or any combinations of the following features (all percentages being expressed by weight relative to the total weight of the electrolyte composition):

from 15% to 35%, more preferably from 17% to 30%, of a non-fluorinated cyclic carbonate selected from ethylene carbonate, propylene carbonate, vinyl ethylene carbonate and mixtures thereof;

from 2% to 10%, more preferably from 3% to 10% of 4-fluoro-1,3-dioxolan-2-one;

from 30% to 70%, more preferably from 50% to 70% of a fluorinated acyclic carboxylic acid ester selected from 2,2-difluoroethyl acetate, 2,2-difluoroethyl propionate, 2,2,2-trifluoroethyl acetate, 2,2-difluoroethyl formate and mixtures thereof;

from 9% to 16%, more preferably from 11% to 16%, of an electrolyte salt selected from lithium hexafluorophosphate, lithium bis(fluorosulfonyl)imide, lithium bis(trifluoromethanesulfonyl)imide and mixtures thereof;

from 0.4% to 2%, more preferably from 0.5% to 1% of an additional lithium compound selected from lithium difluorophosphate, lithium bis(oxalato)borate and mixtures thereof;

from 0.4% to 5%, more preferably from 0.5% to 3% of a cyclic sulfur compound selected from 1,3,2-dioxathiolane-2,2-dioxide, 1,3,2-dioxathiane-2,2-dioxide, 1,3-propane sultone and mixtures thereof;

from 0.25% to 1%, more preferably from 0.30% to 0.80% of a cyclic carboxylic acid anhydride selected from maleic anhydride, succinic anhydride, glutaric anhydride, 2,3-dimethylmaleic anhydride, citraconic anhydride and mixtures thereof.

The disclosure of all patent applications, and publications cited herein are hereby incorporated by reference, to the extent that they provide exemplary, procedural or other details supplementary to those set forth herein. Should the disclosure of any of the patents, patent applications, and publications that are incorporated herein by reference conflict with the present specification to the extent that it might render a term unclear, the present specification shall take precedence.

Each and every claim is incorporated into the specification as an embodiment of the present invention. Thus, the claims are a further description and are an addition to the preferred embodiments of the present invention.

Description of Analysis Methods a) Coin Cell Testing a) Coin Cell Preparation

For the preparation of a positive electrode, a slurry that contains electrochemical active material, conductor (Super P, Timcal), binder (KF #9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with 230 μm gap. The slurry coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1M LiPF$_6$ in EC/DMC (1:2) is used as electrolyte and is dropped between separator and electrodes. Then, the coin cell is completely sealed to prevent leakage of electrolyte.

b) Testing Method 1

Method 1 is a conventional "constant cut-off voltage" test. The conventional coin cell test in the present invention follows the procedure shown in Table 1. Each cell is cycled at 25° C. using a Toscat-3100 computer-controlled galvanostatic cycling station (from Toyo). The coin cell testing procedure uses a 1C current definition of 160 mA/g and comprises two parts as follows: Part I is the evaluation of rate performance at 0.1C, 0.2C, 0.5C, 1C, 2C, and 3C in the 4.3-3.0V/Li metal window range. With the exception of the 1$^{st}$ cycle where the initial charge capacity (CQ1) and discharge capacity (DQ1) are measured in constant current mode (CC), all subsequent cycles feature a constant current-constant voltage during the charge with an end current criterion of 0.05C. A rest time of 30 minutes for the first cycle and 10 minutes for all subsequent cycles is allowed between each charge and discharge.

Part II is the evaluation of cycle life at 1C. The charge cut-off voltage is set as 4.5V/Li metal. The discharge capacity at 4.5V/Li metal is measured at 0.1C at cycles 7 and 34 and 1C at cycles 8 and 35.

Part III is an accelerated cycle life experiment using 1C rate for the charge and 1C rate for the discharge between 4.5 and 3.0V/Li metal. Capacity fading is calculated as follows:

$$1C/1C\ QFad. = \left(1 - \frac{DQ60}{DQ36}\right) \times \frac{10000}{24} \text{in } \%/100 \text{ cycles}$$

TABLE 1

Coin cell testing method 1 procedure

| | | Charge | | | | Discharge | | | |
|---|---|---|---|---|---|---|---|---|---|
| Type | Cycle No | C Rate | End current | Rest (min) | V/Li metal (V) | C Rate | End current | Rest (min) | V/Li metal (V) |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II | 7 | 0.25 | 0.1 C | 10 | 4.5 | 0.10 | — | 10 | 3.0 |
| | 8 | 0.25 | 0.1 C | 10 | 4.5 | 1.00 | — | 10 | 3.0 |
| | 9~33 | 0.50 | 0.1 C | 10 | 4.5 | 1.00 | — | 10 | 3.0 |
| | 34 | 0.25 | 0.1 C | 10 | 4.5 | 0.10 | — | 10 | 3.0 |
| | 35 | 0.25 | 0.1 C | 10 | 4.5 | 1.00 | — | 10 | 3.0 |
| Part III | 36~60 | 1.00 | — | 10 | 4.5 | 1.00 | — | 10 | 3.0 | c) Testing Method 2

It is not easy to compare cycling stability of different cathode materials if their specific capacities are different. If one sample has a low capacity and cycles well, and the other has a high capacity and cycles worse, it is not easy to make a "fair" comparison. Therefore, "Testing Method 2" uses a constant charge capacity protocol. Testing method 2 compares the cycle stability at the same capacity. A fixed charge capacity of 200 mAh/g is chosen. In general, during cycling "fade" is observed since reversible capacity is lost. Thus, in order to keep the charge capacity fixed at 200 mAh/g, the charging voltage increases continuously.

Monitoring the end-of-charge voltage is a sensitive tool to quantify the fade rate during cycling under fixed charge voltage conditions. The faster the voltage increases the worse is the cycle stability.

A maximum voltage of 4.7V is defined. Testing at higher voltages makes little sense as the electrolyte stability deteriorates dramatically at high voltage. Therefore, if the charge voltage exceeds 4.7V, the testing switches to constant voltage (V=4.7V) testing type. The switch-over cycle from constant Q to constant V is easily detected when plotting the capacities as a function of cycle number. It is a good reference to characterize the cycle stability: the later the switch-over happens the better is the cycle stability.

Finally, during "normal" (constant V) testing, the full capacity is not always achieved as of the first cycle. Sometimes the capacity increases during the first few cycles. This effect is called "negative fade" or "activation". In order to minimize such effects—before applying the fixed charge capacity of 200 mAh/g, 10 cycles at low voltage are performed. A low voltage which is a "soft" testing condition is chosen because it allows to avoid capacity losses caused by structural damage during activation. Thus, it is intended that the capacity fading happens during the following "harsh" cycles using the fixed charge capacity of 200 mAh/g.

Table 2 shows the detailed testing protocol. The coin cell testing procedure uses a 1C current definition of 220 mA/g and comprise two parts as follows:

Part I (activation) is the evaluation of cycle life from the 1$^{st}$ to the 10$^{th}$ cycle at 0.5C in the 4.1-3.0V/Li metal window range. Cycles feature a constant current-constant voltage during the charge with an end current criterion of 0.05C. A rest time of 20 minutes for all cycles is allowed between each charge and discharge.

Part II (constant Q cycling) is the evaluation of cycle life under the fixed charge capacity (Q). For the 1$^{st}$ cycle in this part, the charge and discharge capacity is measured at 0.2C in the 4.3-3.0V/Li metal window range. During the next 9 cycles, a test is performed to achieve the fixed charge capacity. The charging time is limited to the moment when 200 mAh/g of charge capacity is obtained. In order to acquire the fixed capacity, the end-of-charge voltage increases. And when the charge voltage exceeds 4.7V, the testing switches to constant voltage (V=4.7V) testing type. This procedure is repeated four times. Finally, one cycle is further measured at 0.2C.

The cycle stability is measured by a slope (S) calculated as follows:

$$S = \frac{(4.7V - \text{End of charge voltage at 14 cycles})}{N(\text{cycle})} \times \frac{1000(\text{mV})}{1(\text{V})}$$

where N is the number of cycles (after cycle 14) until reaching 4.7V or N is 37 when the voltage of 4.7V is not reached at cycle 51. The lower the slope S the more stable cycling material is observed.

TABLE 2

Coin cell testing method 2 procedure

| | | Charge | | | | | Discharge | | | |
|---|---|---|---|---|---|---|---|---|---|---|
| Type | Cycle No | C Rate | End Current | Rest (min) | Time limit | V/Li metal (V) | C Rate | End Current | Rest (min) | V/Li metal (V) |
| Part I | 1~10 | 0.5 C | 0.05 C | 20 | | 4.1 | 0.5 C | — | 20 | 3.0 |
| Part II | 11 | 0.2 C | | 20 | | 4.3 | 0.2 C | — | 20 | 3.0 |
| | 12~20 | 0.5 C | | 20 | Q | 4.7 | 0.5 C | — | 20 | 3.0 |
| | 21 | 0.2 C | | 20 | | 4.3 | 0.2 C | — | 20 | 3.0 |
| | 22~30 | 0.5 C | | 20 | Q | 4.7 | 0.5 C | — | 20 | 3.0 |
| | 31 | 0.2 C | | 20 | | 4.3 | 0.2 C | — | 20 | 3.0 |
| | 32~40 | 0.5 C | | 20 | Q | 4.7 | 0.5 C | — | 20 | 3.0 |
| | 41 | 0.2 C | | 20 | | 4.3 | 0.2 C | — | 20 | 3.0 |
| | 42~50 | 0.5 C | | 20 | Q | 4.7 | 0.5 C | — | 20 | 3.0 |
| | 51 | 0.2 C | | 20 | | 4.3 | 0.2 C | — | 20 | 3.0 |

*Q = 200 mAh/g d) Testing Method 3

"Testing method 3" is a test of storage properties. In this test the capacity is measured before and after storage at a high temperature. Coin cells are prepared as described above. The capacity is measured at 0.1C in the 4.3-3.0V/Li metal window range. Table 3 summarizes the details of the applied testing procedure.

TABLE 3

Storage properties testing procedure before storage

| | | Charge | | | | | Discharge | | |
|---|---|---|---|---|---|---|---|---|---|
| Cycle No | C Rate | End Current | Rest (min) | Time limit | V/Li metal (V) | C Rate | End Current | Rest (min) | V/Li metal (V) |
| 1 | 0.1 C | 0.05 C | 20 | | 4.3 | 0.1 | — | 20 | 3.0 |
| 2 | 0.1 C | | | X | 4.8 | | | | |

*X = 190 mAh/g

The discharge capacity DQ1' at the $1^{st}$ cycle is used as a reference value to evaluate the storage properties. The $2^{nd}$ cycle charges to prepare for storage. After charging the coin cells until 190 mAh/g, the coin cells are disassembled. Because electrodes are "wet", excess electrolyte is removed by washing with DMC and the electrodes are sealed in Al pouch bags. These pouch bags are stored at 80° C. for 2 weeks. After storage, new coin cells are assembled with these electrodes and fresh electrolyte. After inserting in the battery cycler machine, a post-mortem cycling schedule is applied and the remaining capacity is measured. Table 4 summarizes the details of the applied post-mortem testing procedure. Here, the retained capacity (DQ2")=the discharge capacity at the $2^{nd}$ cycle is chosen to evaluate the storage properties. The properties are determined by the change of discharge capacities before and after the storage period. The recovered capacity (R.Q) is calculated as follows:

TABLE 4

Storage properties testing procedure after storage

| | | Charge | | | | | Discharge | |
|---|---|---|---|---|---|---|---|---|
| Cycle No | C Rate | End Current | Rest (min) | V/Li metal (V) | C Rate | End Current | Rest (min) | V/Li metal (V) |
| 1-3 | 0.1 C | 0.05 C | 10 | 4.3 | 0.1 | — | 10 | 3.0 |

$$R.Q = \frac{DQ2''}{DQ1'} \times 100(\%)$$

B) Carbon Analysis

The carbon content of the cathode materials is measured by a Horiba EMIA-320V Carbon/Sulfur analyzer. 1 g of cathode materials is placed in a ceramic crucible in a high frequency induction furnace. 1.5 g of tungsten and 0.3 g of tin as accelerators are added into the crucible. The materials is heated at a programmable temperature. Gases produced during the combustion are then analyzed by four infrared detectors. The analysis of $CO_2$ and CO contents determines the carbon concentration.

C) Differential Scanning Calorimetry (DSC) Analysis

Coin cell electrodes are prepared as described above. Small electrodes, containing about 3.3 mg of active material are punched and assembled in coin cells. The cells are charged to 4.3V using a C/24 rate followed by a constant voltage soak for at least 1 hour. After disassembly of the coin cells, electrodes are repeatedly washed with dimethyl carbonate (DMC) to remove the remaining electrolyte. After evaporation of DMC, the electrodes are immersed into stainless steel cans and about 1.3 mg of electrolyte is added, followed by hermetic closing (crimping) of the cells. The electrolyte is the same as used for the coin cell preparation described above. The DSC measurement is performed using a TA instrument DSC Q10 device. The DSC scan is conducted from 50 to 350° C. using a heat rate of 5° C./min. DSC cells and crimping equipment were also supplied by TA. The exothermic heat capacity is estimated by integrating the peak area above a baseline between 10° and 320° C.

D) Full Cell Testing

A) Full Cell Electrode Preparation 1

650 mAh pouch-type cells are prepared as follows: the cathode material, Super-P (Super-P™ Li commercially available from Timcal), graphite (KS-6 commercially available from Timcal) as positive electrode conductive agents and polyvinylidene fluoride (PVDF 1710 commercially available from Kureha) as a positive electrode binder are added to N-methyl-2-pyrrolidone (NMP) as a dispersion medium so that the mass ratio of the positive electrode active material powder, the positive electrode conductive agents super P and graphite, and the positive electrode binder is set at a mass ratio of 92/3/1/4. Thereafter, the mixture is kneaded to prepare a positive electrode mixture slurry. The resulting positive electrode mixture slurry is then applied onto both sides of a positive electrode current collector, made of a 15 µm thick aluminum foil. The width of the applied area is 43 mm and the length is 447 mm. Typical cathode active material loading weight is 11.5±0.2 mg/cm². The electrode is then dried and calendared using a pressure of 120 Kgf (1176.8 N). Typical electrode density is 3.3±0.05 g/cm³. In addition, an aluminum plate serving as a positive electrode current collector tab is arc-welded to an end portion of the positive electrode.

Commercially available negative electrodes are used. In short, a mixture of graphite, carboxy-methyl-cellulose-sodium (CMC) and styrenebutadiene-rubber (SBR), in a mass ratio of 96/2/2, is applied on both sides of a copper foil. A nickel plate serving as a negative electrode current collector tab is arc-welded to an end portion of the negative electrode. A typical loading weight of a negative electrode active material is 8.0±0.2 mg/cm².

B) Full Cell Electrode Preparation 2

200 mAh pouch-type cells are prepared as follows: the cathode material, Super-P (Super-P™ Li commercially available from Timcal), graphite (KS-6 commercially available from Timcal) as positive electrode conductive agents and polyvinylidene fluoride (PVDF 1710 commercially available from Kureha) as a positive electrode binder are added to N-methyl-2-pyrrolidone (NMP) as a dispersion medium so that the mass ratio of the positive electrode active material powder, the positive electrode conductive agents super P and graphite, and the positive electrode binder is set at a mass ratio of 92/3/1/4. Thereafter, the mixture is kneaded to prepare a positive electrode mixture slurry. The resulting positive electrode mixture slurry is then applied onto both sides of a positive electrode current collector, made of a 15 µm thick aluminum foil. The width of the applied area is 26 mm and the length is 207 mm. Typical cathode active material loading weight is 11.0±0.2 mg/cm². The electrode is then dried and calendared using a pressure of 120 Kgf (1176.8 N). Typical electrode density is 3.3±0.05 g/cm³. In addition, an aluminum plate serving as a positive electrode current collector tab is arc-welded to an end portion of the positive electrode.

Commercially available negative electrodes are used. In short, a mixture of graphite, carboxy-methyl-cellulose-sodium (CMC) and styrenebutadiene-rubber (SBR), in a mass ratio of 96/2/2, is applied on both sides of a copper foil. A nickel plate serving as a negative electrode current collector tab is arc-welded to an end portion of the negative electrode. A typical loading weight of a negative electrode active material is 10.0±0.2 mg/cm².

C) Full Cell Assembly

A sheet of the positive electrode, a sheet of the negative electrode, and a sheet of separator made of a 20 μm-thick microporous polymer film (Celgard® 2320 commercially available from Celgard) interposed between them are spirally wound using a winding core rod in order to obtain a spirally-wound electrode assembly. The assembly and the electrolyte are then put in an aluminum laminated pouch in an air-dry room with dew point of −50° C., so that a flat pouch-type lithium secondary battery is prepared. The design capacity of the secondary battery is 650 or 200 mAh when charged to 4.20V.

For the full cell assembly, 3 kinds of electrolytes are used.

A first electrolyte is obtained by dissolving a lithium hexafluorophosphate ($LiPF_6$) salt at a concentration of 1.2 mol/L in a mixed solvent of ethylene carbonate (EC), diethyl carbonate (DEC) and ethylmethyl carbonate (EMC) in a volume ratio of 1:1:1. Further, 1 wt % vinylene carbonate (VC), 1 wt % lithium difluorophosphate ($LiPO_2F_2$), 0.5 wt % lithium bis(oxalato)borate (LiBOB), and 0.5 wt % 1,3-propene sultone (PRS) of the total weight of the above mixture are added as additives. The prepared electrolyte is named EL1.

A second electrolyte is prepared by combining 2,2-difluoroethyl acetate (DFEA, Solvay) monofluoroethylene carbonate (FEC, Enchem), propylene carbonate (PC, Enchem) in a mass ratio of 75:4:21. 85.78 g of this mixture is combined with 11.37 g of $LiPF_6$, 0.85 g of LiBOB, 1.50 g of 1,3,2-dioxathiolane 2,2-dioxide (ESa, Enchem) and 0.50 g of maleic anhydride (MA, Enchem). The prepared electrolyte is named EL2.

A third electrolyte is prepared by dissolving a $LiPF_6$ salt at a concentration of 1.2 mol/L in a mixed solvent of EC, DEC, and EMC in a volume ratio of 1:1:1. Additionally, 1.5 wt % vinyl ethylene carbonate (VEC), 1.5 wt % vinylene carbonate (VC), and 1% lithium difluorophosphate ($LiPO_2F_2$) of the total weight of the above mixture are included as additives. The prepared electrolyte is named EL3.

The non-aqueous electrolyte solution is impregnated for 8 hours at room temperature. The battery is pre-charged at 15% of its theoretical capacity and aged for a day at room temperature. The battery is then degassed and the aluminum pouch is sealed. The battery is prepared for use as follows: the battery is charged using a current of 0.25C (with 1C=650 or 200 mAh) in CC mode (constant current) up to 4.2 or 4.35V then CV mode (constant voltage) until a cut-off current of C/20 is reached, before being discharged in CC mode at 0.5C rate down to a cut-off voltage of 2.7 or 3.0V. And then the battery is charged using a current of 0.5C in CC mode (constant current) up to 4.2 or 4.35V then CV mode until a cut-off current of C/20 is reached.

D1) Full Cell Testing Method 1

The prepared full cell battery is charged and discharged several times under the following conditions at 45° C., to determine their charge-discharge cycle performance:

charge is performed in CC mode under 1C rate up to 4.2V, then CV mode until C/20 is reached, the cell is then set to rest for 10 minutes, discharge is done in CC mode at 1C rate down to 2.7V, the cell is then set to rest for 10 minutes, the charge-discharge cycles proceed until the battery reaches around 80% retained capacity. Every 100 cycles, one discharge is done at 0.2C rate in CC mode down to 2.7 V.

The number of cycles at 80% of recovered capacity (# of cycles at 80% of R.Q.) is obtained to count the number of cycles when the discharge capacity in the cycle reaches 80% of the initial discharge capacity. If the discharge capacity doesn't reach 80% of the initial discharge capacity within 1000 cycles, the # of cycle at 80% of R.Q. is extrapolated using the last 50 cycles assuming that the discharge capacity continues to decrease linearly.

D2) Full Cell Testing Method 2

The prepared full cell is charged and discharged several times under the following conditions at 25° C., to determine their charge-discharge cycle performance:

charge is performed in CC mode under 1C rate up to 4.35V, then CV mode until C/20 is reached, the cell is then set to rest for 10 minutes, discharge is done in CC mode at 1C rate down to 3.0V, the cell is then set to rest for 10 minutes, the charge-discharge cycles proceed until the battery reaches around 80% retained capacity.

The number of cycles at 80% of recovered capacity (# of cycles at 80% of R.Q.) is obtained to count the number of cycles when the discharge capacity in the cycle reaches 80% of the initial discharge capacity. If the discharge capacity doesn't reach 80% of the initial discharge capacity within 1000 cycles, the # of cycle at 80% of R.Q. is extrapolated using the last 50 cycles assuming that the discharge capacity continues to decrease linearly.

The internal resistance or direct current resistance (DCR) is measured by suitable pulse tests of the battery. The measurement of DCR is for example described in "Appendix I page 2 of the USABC Electric Vehicle Battery Test Procedures" which can be found at http://www.uscar.org. USABC stands for "US advanced battery consortium" and USCAR stands for "United States Council for Automotive Research".

A DCR increase after 500 cycles is obtained as follows:

$$DCR \text{ increase } (\%) = \frac{DCR \text{ after } 502 \text{ cycles(V)}}{DCR \text{ after } 4 \text{ cycles(V)}} \times 100 - 100(\%)$$

D3) Full Cell Testing Method 3

The tests are conducted using the same way as in the method D2) but at 45° C.

D4) Bulging Test 650 or 200 mAh pouch-type batteries prepared by above preparation method are fully charged until 4.35V and inserted in an oven which is heated to 90° C. and stored there for 4 hours. At 90° C., the charged cathode reacts with electrolyte and creates gas. The evolved gas creates a bulging. The increase of thickness or expansion ratio ((thickness after storage-thickness before storage)/thickness before storage) is measured after 4 hours.

MANUFACTURING EXAMPLE

The following description gives an example of the manufacturing procedure of high Ni-excess NMC powders through a double sintering process which is a solid state reaction between a lithium source, usually $Li_2CO_3$ or $LiOH \cdot H_2O$, and a mixed transition metal source, usually a mixed transition metal hydroxide $M'(OH)_2$ or oxyhydroxide M'OOH (with M'=Ni, Mn and Co), but not limited to these hydroxides, as discussed before. The double sintering process includes amongst others two sintering steps:

1) $1^{st}$ blending: to obtain a lithium deficient sintered precursor, the lithium and the mixed transition metal sources are homogenously blended in a Henschel Mixer® for 30 mins.

2) $1^{st}$ sintering: the blend from the $1^{st}$ blending step is sintered at 700 to 950° C. for 5-30 hours under an oxygen containing atmosphere in a furnace. After the $1^{st}$ sintering, the sintered cake is crushed, classified and sieved so as to ready it for the $2^{nd}$ blending step. The product obtained from this step is a lithium deficient sintered precursor, meaning that the Li/M' stoichiometric ratio in $LiM'O_2$ is less than 1.

3) $2^{nd}$ blending: the lithium deficient sintered precursor is blended with $LiOH \cdot H_2O$ in order to correct the Li stoichiometry. The blending is performed in a Henschel Mixer® for 30 mins.

4) $2^{nd}$ sintering: the blend from the $2^{nd}$ blending is sintered in the range of 800 to 950° C. for 5-30 hours under an oxygen containing atmosphere in a furnace.

5) Post treatment: after the $2^{nd}$ sintering, the sintered cake is crushed, classified and sieved so as to obtain a non-agglomerated NMC powder.

Example 1

Sample EX1.1 is prepared according to the above-mentioned "Manufacturing Example". A mixed nickel-manganese-cobalt hydroxide $(M'(OH)_2)$ is used as a precursor, where $M'(OH)_2$ is prepared by a co-precipitation process in a large-scale continuous stirred tank reactor (CSTR) with mixed nickel-manganese-cobalt sulfates, sodium hydroxide and ammonia. In the $1^{st}$ blending step, 5.5 kg of the mixture of $M'(OH)_2$, wherein M'=$Ni_{0.625}Mn_{0.175}Co_{0.20}$ (Ni-excess=0.45), and $LiOH \cdot H_2O$ with Li/M' ratio of 0.85 is prepared. The $1^{st}$ blend is sintered at 800° C. for 10 hours under an oxygen atmosphere in a chamber furnace. The resultant lithium deficient sintered precursor is blended with $LiOH \cdot H_2O$ in order to prepare 50 g of the $2^{nd}$ blend of which Li/M' is 1.01. The $2^{nd}$ blend is sintered at 840° C. for 10 hours under the dry air atmosphere in a chamber furnace. The above prepared EX1.1 has the formula $Li_{1.005}M'_{0.995}O_2$ (Li/M'=1.01).

EX1.2, which has the formula $Li_{0.975}M'_{1.025}O_2$ (Li/M'=0.95), is prepared according to the same method as in EX1.1 except that the $1^{st}$ and $2^{nd}$ sintering temperatures are 720° C. and 845° C., respectively.

EX1.3, which has the formula $Li_{1.015}M'_{0.985}O_2$ (Li/M'=1.03), is prepared according to the same method as in EX1.1 except that the $2^{nd}$ sintering temperature is 835° C.

EX1.4, which has the formula $Li_{1.024}M'_{0.976}O_2$ (Li/M'=1.05), is prepared according to the same method as in EX1.1 except that the $2^{nd}$ sintering temperature is 835° C.

To evaluate the example as a positive electrode for lithium ion batteries, coin cells are prepared by the above-mentioned "Coin cell preparation". The conventional coin cell test of the example is performed by the above-mentioned "Testing Method 1". Initial discharge capacity (DQ1) is measured at 0.1C in the 4.3-3.0V/Li metal window range. Capacity fading (1C/1C QFad.) is measured at 1C for charge and discharge in the 4.5-3.0V/Li metal. To investigate the cycle stability of the example at fixed state of charge, a coin cell is evaluated by the above-mentioned "Testing Method 2" and the fixed charge capacity of 200 mAh/g are used. The slope (S), which means the cycle stability, is evaluated using the end-of-charge voltage as function of cycle number until the switch-over point. The storage property of the example at 80° C. for 2 weeks is estimated by the above-mentioned "Testing Method 3". The recovered capacity (R.Q), which indicates the storage property, is evaluated by observing the capacity change before (DQ1') and after storage (DQ2").

The carbon content of the samples is measured by the above-mentioned "Carbon Analysis". Carbon concentration is determined by detecting the produced gases ($CO_2$ and CO) during the combustion of a sample at 50-350° C. The thermal stability of the example is investigated by the above-mentioned "DSC Analysis". The exothermic heat capacity is estimated by integrating the peak area above a baseline between 10° and 320° C. in the DSC result.

The initial discharge capacity, capacity fading, slope, recovered capacity, carbon content, and exothermic heat capacity of EX1.1 to EX1.4 are shown in Table 5.

Comparative Example 1

Sample CEX1, which has the formula $Li_{1.034}M'_{0.966}O_2$ (Li/M'=1.07), is prepared according to the same method as in EX1.1 except that the $1^{st}$ and $2^{nd}$ sintering temperatures are 720° C. and 830° C., respectively.

Comparative Example 2

Sample CEX2 with a composition $Li_{1.005}M'_{0.995}O_2$ (Li/M'=1.01) is obtained according to the same method as in EX1.1, except that M' in $M'(OH)_2$ is $Ni_{0.65}Mn_{0.10}Co_{0.25}$ (Ni-excess=0.55) and the $2^{nd}$ sintering temperature is 800° C.

Comparative Example 3

CEX3 with a composition $Li_{1.005}M'_{0.995}O_2$ (Li/M'=1.01) is prepared according to the same method as in EX1.1, except that M' in $M'(OH)_2$ is $Ni_{0.65}Mn_{0.175}Co_{0.175}$ (Ni-excess=0.48) and the $2^{nd}$ sintering temperature is 825° C.

Comparative Example 4

CEX4 with a composition $Li_{1.005}M'_{0.995}O_2$ (Li/M'=1.01) is obtained according to the same method as in EX1.1, except that M' in $M'(OH)_2$ is $Ni_{0.6}Mn_{0.2}Co_{0.2}$ (Ni-excess=0.4) and the $2^{nd}$ sintering temperature is 860° C.

Comparative Example 5

CEX5 with a composition $LiM'O_2$ (Li/M'=1.00) is obtained according to the same method as in EX1.1, except that M' in $M'(OH)_2$ used as precursor is $Ni_{0.68}Mn_{0.12}Co_{0.2}$ (Ni-excess=0.56) and the $2^{nd}$ sintering temperature is 820° C.

Comparative Example 6

CEX6 with formula $Li_{0.995}M'_{1.005}O_2$ (Li/M'=0.99) is obtained according to the same method as in EX1.1, except that M' in M'(OH)$_2$ is Ni$_{0.7}$Mn$_{0.15}$Co$_{0.15}$ (Ni-excess=0.55) and the 2$^{nd}$ sintering temperature is 830° C.

The initial discharge capacities and capacity fading of comparative examples CEX1 to 6 are measured according to the same method as in EX1. So too are the slope of the example, which means the cycle stability, the storage property at 80° C. for 2 weeks, and the carbon content. The initial discharge capacity, capacity fading, slope, recovered capacity, and carbon content are shown in Table 5.

Example 2

EX2.1 is prepared according to the above-mentioned "Manufacturing Example". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the 1$^{st}$ blending step, 5.5 kg of the mixture of M'(OH)$_2$, wherein M'=Ni$_{0.625}$Mn$_{0.175}$Co$_{0.20}$ (Ni-excess=0.45), and Li$_2$CO$_3$ with Li/M' ratio of 0.8 is prepared. The 1$^{st}$ blend is sintered at 885° C. for 10 hours under the dry air atmosphere in a chamber furnace. The resultant lithium deficient sintered precursor is blended with LiOH·H$_2$O in order to prepare 4.5 kg of the 2$^{nd}$ blend of which Li/M' is 1.045. The 2$^{nd}$ blend is sintered at 840° C. for 10 hours in a dry air atmosphere in a chamber furnace. The above prepared EX2.1 has the formula Li$_{1.022}$M'$_{0.978}$O$_2$(Li/M'=1.045).

EX2.2, which is an aluminum coated lithium transition metal oxide, is prepared by the following procedure. 1.3 kg of EX2.1 is blended with 0.26 g of aluminum oxide. The blend is heated at 750° C. for 7 hours in a chamber furnace. The heated aluminum coated lithium transition metal oxide is sieved with a 270 mesh (ASTM) sieve.

EX2.3, which is an aluminum coated lithium transition metal oxide containing LiNaSO$_4$ as a secondary phase, is prepared by the following procedure. 4.0 kg of EX2.1 is blended with 8.0 g of aluminum oxide to prepare the 1$^{st}$ blend. The 1$^{st}$ blend is blended with a Na$_2$S$_2$O$_8$ solution (48 g Na$_2$S$_2$O$_8$ powder in 140 ml water) by a high RPM blender to prepare the 2$^{nd}$ blend. The 2$^{nd}$ blend is heated at 375° C. for 6 hours. The heated aluminum coated lithium transition metal oxide containing LiNaSO$_4$ as a secondary phase is sieved using a 270 mesh (ASTM) sieve.

The initial capacities and capacity fading of EX2.1, EX2.2 and EX2.3 are measured according to the same method as in EX1 and are shown in Table 5. For full cell testing of EX2.1, EX2.2 and EX2.3, positive electrodes are prepared using the above mentioned "Full cell electrode preparation 1". EX2.1—FC, EX2.2—FC and EX2.3—FC, which are 650 mAh pouch-type batteries, are prepared by the method described in "Full cell assembly" using the prepared positive electrodes and EL1 as an electrolyte. Full cell testing is performed following the above mentioned "Full cell testing method D1)", yielding a number of cycles at 80% of recovered capacity that is given in Table 6.

Comparative Example 7

CEX7.1 is prepared according to the above-mentioned "Manufacturing Example". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the 1$^{st}$ blending step, 5.5 kg of the mixture of M'(OH)$_2$, wherein M'=Ni$_{0.6}$Mn$_{0.2}$Co$_{0.2}$ (Ni-excess=0.40), and Li$_2$CO$_3$ with a Li/M' ratio of 0.85 is prepared. The 1$^{st}$ blend is sintered at 900° C. for 10 hours under a dry air atmosphere in a chamber furnace. The resultant lithium deficient sintered precursor is blended with LiOH·H$_2$O in order to prepare 3.0 kg of the 2$^{nd}$ blend with a Li/M' ratio of 1.055. The 2$^{nd}$ blend is sintered at 855° C. for 10 hours under a dry air atmosphere in a chamber furnace. The above prepared CEX7.1 has the formula Li$_{1.027}$M'$_{0.973}$O$_2$(Li/M'=1.055).

CEX7.2, which is an aluminum coated lithium transition metal oxide, is prepared by the following procedure. 1.3 kg of EX7.1 is blended with 0.26 g of aluminum oxide. The blend is heated at 750° C. for 5 hours in a chamber furnace. The heated aluminum coated lithium transition metal oxide is sieved with a 270 mesh (ASTM) sieve.

Comparative Example 8

CEX8 is prepared according to the above-mentioned "Manufacturing Example". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the 1$^{st}$ blending step, 5.5 kg of the mixture of M'(OH)$_2$, wherein M'=Ni$_{0.70}$Mn$_{0.15}$Co$_{0.15}$ (Ni-excess=0.55), and LiOH·H$_2$O with Li/M' ratio of 0.85 is prepared. The 1$^{st}$ blend is sintered at 800° C. for 10 hours under an oxygen atmosphere in a RHK (roller hearth kiln). The resulting lithium deficient sintered precursor is blended with LiOH·H$_2$O in order to prepare 3.0 kg of a 2$^{nd}$ blend with a Li/M' ratio of 0.99. The 2$^{nd}$ blend is sintered at 830° C. for 10 hours under an oxygen atmosphere in a chamber furnace. The above prepared CEX8 has the formula Li$_{0.995}$M'$_{1.005}$O$_2$(Li/M'=0.99).

Initial capacities and capacity fading of CEX7.1, CEX7.2 and CEX8 are measured according to the same method as in EX1 and are shown in Table 5. For full cell testing of CEX7.1, CEX7.2 and CEX8, positive electrodes are prepared using the above mentioned "Full cell electrode preparation 1". CEX7.1—FC, CEX7.2—FC and CEX8-FC, which are 650 mAh pouch-type batteries, are prepared by the method described in "Full cell assembly" using the prepared positive electrodes and EL1 as an electrolyte. Full cell testing are performed following the above mentioned "Full cell testing method D1)" yielding a number of cycles at 80% of recovered capacity that is given in Table 6 and in FIG. 9.

Example 3

EX3, which is an industrial scale product, is prepared according to the above-mentioned "Manufacturing Example" with the exact same approach as the Example 2.3. A positive electrode is prepared using the method "Full cell electrode preparation 2" and EX3.

EX3-FC1, which is a 200 mAh pouch-type battery, is prepared by the preparation method described in "Full cell assembly" using the prepared positive electrode and EL2 as an electrolyte.

EX3-FC2, which is a 200 mAh pouch-type battery, is prepared by the preparation method described in "Full cell assembly" using the prepared positive electrode and EL3 as an electrolyte.

Comparative Example 9

CEX9, which is an industrial scale product, is prepared by the same way as the Comparative Example 7.2.

A positive electrode is prepared using the method "Full cell electrode preparation 1" and CEX9. CEX9-FC1, which is a 650 mAh pouch-type battery, is prepared by the preparation method described in "Full cell assembly" using the prepared positive electrode and EL2 as an electrolyte. CEX9-FC2, which is a 650 mAh pouch-type battery, is prepared by the preparation method described in "Full cell assembly" using the prepared positive electrode material and EL3 as an electrolyte.

The testing of EX3-FC1, EX3-FC2, CEX9-FC1, and CEX9-FC2 are performed following the above mentioned full cell testing method (D2 and D3) and bulging test (D4).

The results are summarized in the Table 7.

Next, EX1.1 is compared to examples with low and high Ni-excess. If the Ni-excess is lower, such as CEX4, the capacity at a fixed voltage is lower. Additionally, to achieve the high charge capacity (200 mAh/g), higher charge voltage is applied, resulting in poor cycle stability. Conversely, if the Ni-excess is higher, such as CEX5 and CEX6, they have a higher discharge capacity. Accordingly, to obtain the high charge capacity, a lower charge voltage is applied. However, the safety still deteriorates and the cycle stability is lower compared to the EX1.1. In addition, a higher Ni-excess NMC compound (CEX5) exhibits poor thermal stability.

Furthermore, EX1.1 is compared with examples with higher and lower molar ratio of Ni/Mn. As shown Table 5, if the ratio of Ni/Mn is too high, such as for CEX2, the discharge capacity is high but the cycle stability deteriorates. Conversely, if the ratio of Ni/Mn is too low, such as CEX4, the discharge capacity is low even at high voltage. Accord-

TABLE 5

Properties of Examples

| Example ID | Li/M' | Ni-excess | Co/M' | Ni/Mn | Testing Method 1 1C/1C DQ1 (mAh/g) | QFad. (%/100) | Testing Method 2 Slope (mV) | Testing Method 3 R.Q (%) | Carbon Analysis Carbon (ppm) | DSC Analysis T (° C.) | DSC Analysis H.Q. (kJ/g) | ICP Analysis S (%) |
|---|---|---|---|---|---|---|---|---|---|---|---|---|
| EX1.1 | 1.010 | 0.45 | 0.200 | 3.57 | 182.5 | 17.9 | 7.6 | 83.1 | 364 | 261.4 | 2.108 | 0.14 |
| EX1.2 | 0.950 | 0.45 | 0.200 | 3.57 | 179.6 | 20.2 | | | 185 | | | |
| EX1.3 | 1.030 | 0.45 | 0.200 | 3.57 | 180.7 | 19.1 | 6.4 | | 378 | | | |
| EX1.4 | 1.050 | 0.45 | 0.200 | 3.57 | 179.2 | 18.5 | 2.9 | | 444 | | | |
| CEX1 | 1.070 | 0.45 | 0.200 | 3.57 | 173.8 | 17.0 | | | 766 | | | |
| CEX2 | 1.010 | 0.55 | 0.250 | 6.50 | 182.5 | 24.5 | 10.6 | 85.3 | 303 | | | |
| CEX3 | 1.010 | 0.48 | 0.175 | 3.71 | 179.4 | 19.0 | 19.1 | 85.2 | 229 | | | 0.08 |
| CEX4 | 1.010 | 0.40 | 0.200 | 3.00 | 176.9 | 18.9 | 17.2 | | | 265.9 | 2.018 | 0.14 |
| CEX5 | 1.000 | 0.56 | 0.200 | 5.67 | 184.7 | 21.7 | 12.7 | 45.8 | | 250.6 | 2.240 | 0.13 |
| CEX6 | 0.990 | 0.70 | 0.150 | 4.67 | 184.0 | 22.5 | 17.2 | 85.4 | 229 | | | 0.09 |
| EX2.1 | 1.045 | 0.45 | 0.200 | 3.57 | 179.6 | 19.0 | | | 334 | | | |
| EX2.2 | 1.045 | 0.45 | 0.200 | 3.57 | 178.3 | 13.3 | | | 308 | | | |
| EX2.3 | 1.045 | 0.45 | 0.200 | 3.57 | 182.1 | 11.4 | | | 195 | | | |
| CEX7.1 | 1.055 | 0.40 | 0.200 | 3.00 | 175.1 | 21.6 | | | 598 | | | |
| CEX7.2 | 1.055 | 0.40 | 0.200 | 3.00 | 175.1 | 16.3 | | | | | | |
| CEX8 | 0.990 | 0.55 | 0.150 | 4.67 | 187.1 | 19.5 | | | 302 | | | |

*H.Q.: exothermic heat capacity

TABLE 6

Properties of Examples

| Battery ID | Example ID | Li/M' | Ni-excess | Co/M' | Ni/Mn | Full cell testing D1 # cycle at 80% of R.Q |
|---|---|---|---|---|---|---|
| EX2.1-FC | EX2.1 | 1.045 | 0.45 | 0.200 | 3.57 | 915 |
| EX2.2-FC | EX2.2 | 1.045 | 0.45 | 0.200 | 3.57 | 1271 |
| EX2.3-FC | EX2.3 | 1.045 | 0.45 | 0.200 | 3.57 | 1717 |
| CEX7.1-FC | CEX7.1 | 1.055 | 0.40 | 0.200 | 3.00 | 577 |
| CEX7.2-FC | CEX7.2 | 1.055 | 0.40 | 0.200 | 3.00 | 928 |
| CEX8-FC | CEX8 | 0.990 | 0.55 | 0.150 | 4.67 | 132 |

As shown Table 5, EX1.1 is compared with examples with higher and lower Co content. First, if the Co content is higher, such as for CEX2, the cycle stability decreases due to its lower Mn content. Conversely, if the Co content is lower, such as for CEX3, structural stability during cycling is deteriorated. Even though CEX3 has high Ni-excess of 0.48, it has a lower discharge capacity and worse cycle stability to keep the fixed charge capacity.

ingly, NMC compounds, such as EX1.1, with Ni/Mn of 3.15-4.25, show higher capacity and better cycle stability.

Figure 3:
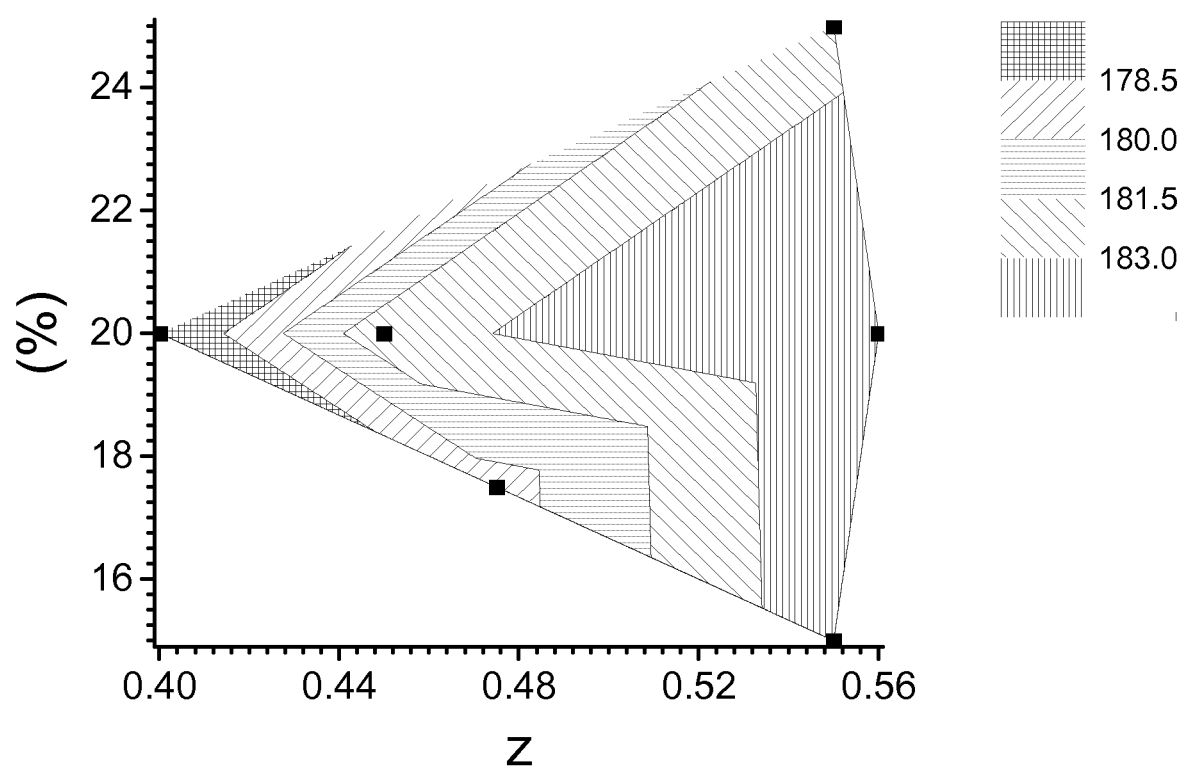

FIG. 3 shows the discharge capacities of the examples measured by "Testing Method 1". The values of DQ1 are indicated by the shading in the different regions using commercial software Origin 9.1—contour plot. In this figure, the x-axis is for the Ni-excess (z) and the y-axis is for the Co/M' (mol/mol %) in the NMC compounds. As the Ni-excess increases, the capacity also increases. The NMC compounds that have a discharge capacity above about 180 mAh/g correspond to compositions with high capacity. We observe an optimum of capacity at Co/M'=20 mol/mol %, higher capacities are achieved with less Ni-excess.

Figure 4:
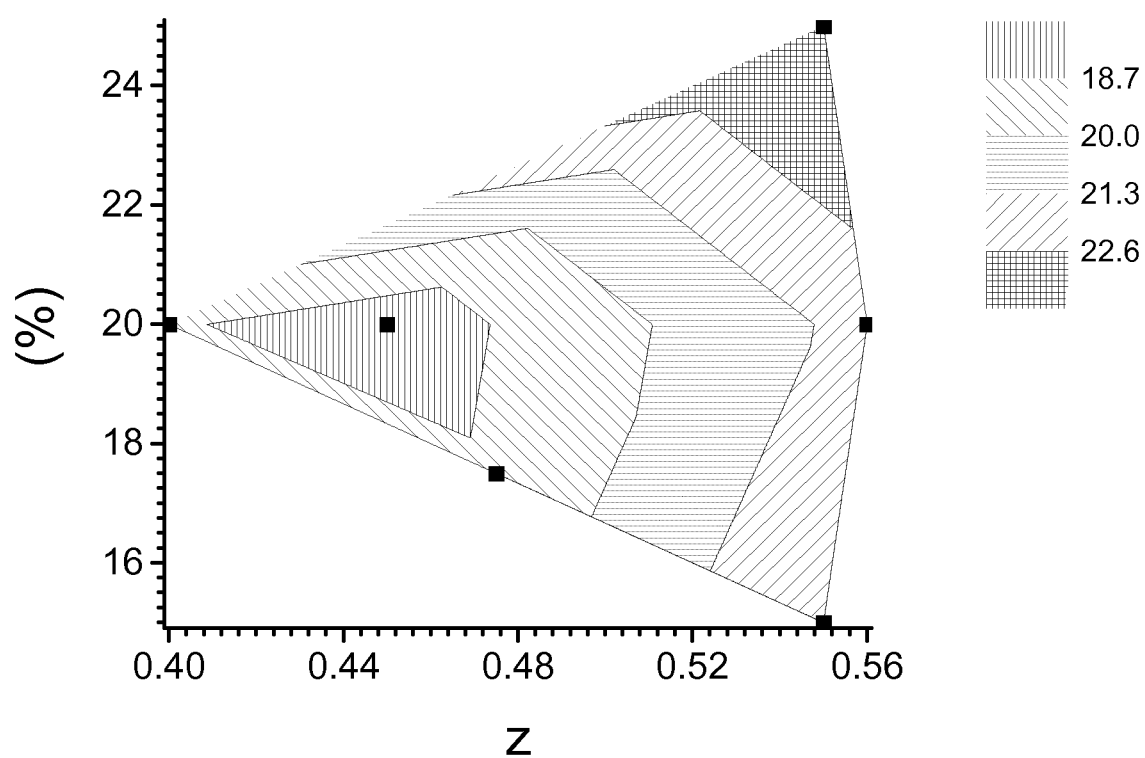
FIG. 4. Contour plot capacity fadings of NMC compounds in coin cell testing method 1

Next, FIG. 4 shows the capacity fade rate of the examples measured by "Testing Method 1". The values of 1C/1C QFad. in % per 100 cycles are indicated by the shading in the different regions using commercial software Origin 9.1—contour plot. In this figure, the x-axis is for Ni-excess (z) and the y-axis is for the Co/M' content (mol/mol %) in the sample. The samples that have a capacity fading below about 20 mol/mol % have a composition with improved cycle life. We observe a certain optimum of Co composition. With increasing Ni-excess, better cycle stabilities are observed at about 20 mol/mol % Co/M'.

Figure 5A:
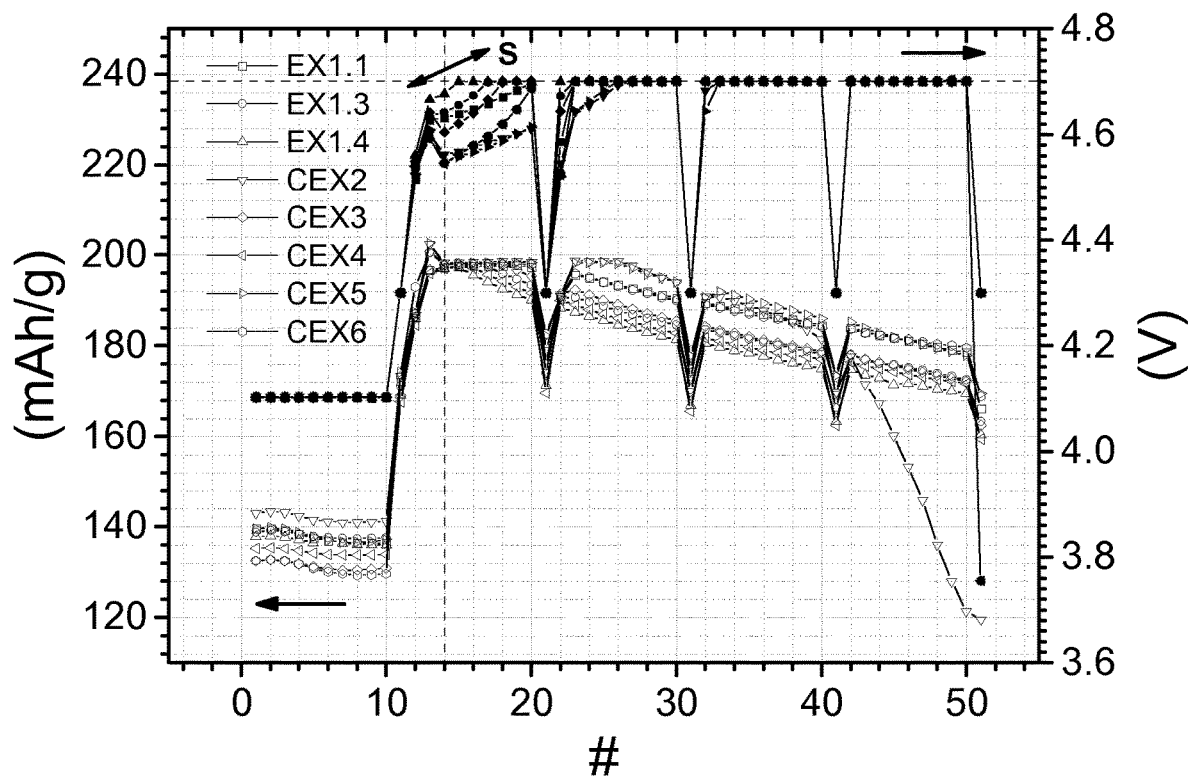
FIG. 5a. Slope results of NMC compounds in coin cell testing method 2
Figure 5B:
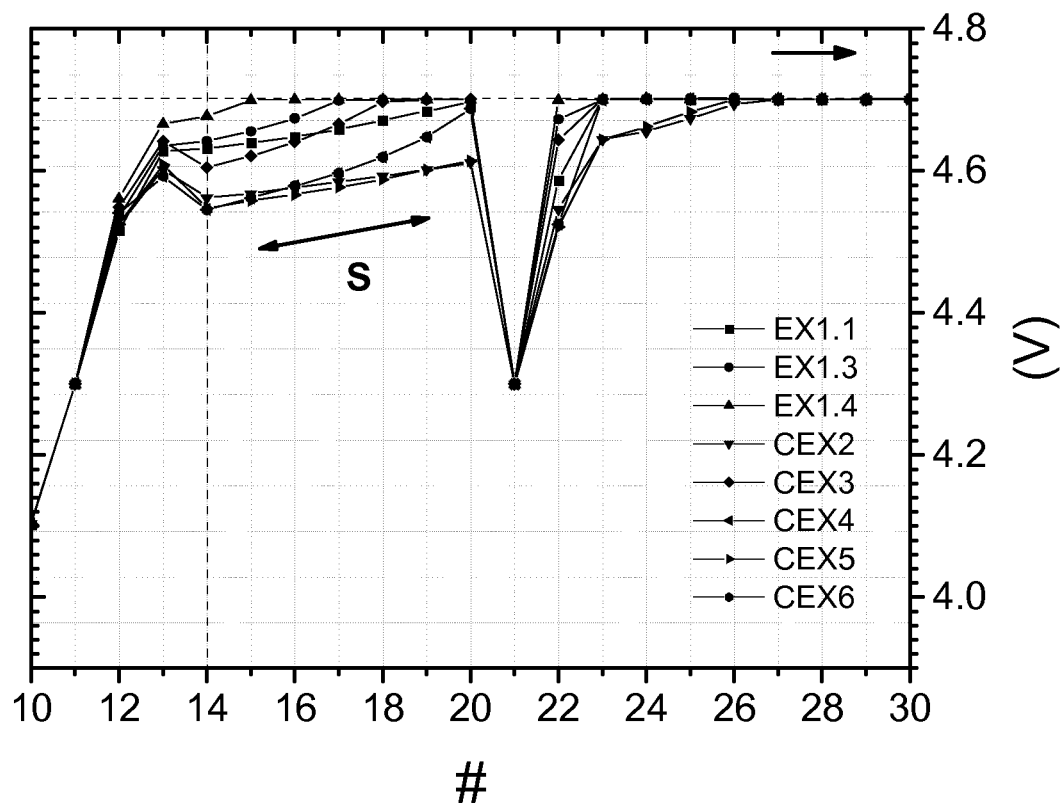

Moreover, FIGS. 5a, 5b (exploded view of upper left corner of FIG. 5a) & 6 show the slope of the examples measured by "Testing Method 2". In FIG. 5a & 5b, the x-axis gives the cycle number and the left and right y-axis are for discharge capacity and real cut-off charge voltage, respectively. In these figures, the values of slope (mV/cycle) are calculated according to the equation in "Testing Method 2". For example, EX1.1 has 4.6317V at cycle 14 and its number of cycles (N) is 23 until reaching 4.7V. The cycle stability of EX1.1 is measured by a slope (S) calculated as follows:

$$S = \frac{(4.7000V - 4.6317V \text{ at } 14 \text{ cycles})}{23 - 14 \text{(cycle)}} \times \frac{1000 \text{(mV)}}{1 \text{(V)}} = 7.6 \text{mV/cycle}$$

Furthermore, CEX3 has 4.6045V at cycle 14 and its number of cycles is 19 until reaching 4.7V. The slope of CEX3 is calculated as follows:

$$S = \frac{(4.7000V - 4.6045 \text{ at } 14 \text{ cycles})}{19 - 14 \text{(cycle)}} \times \frac{1000 \text{(mV)}}{1 \text{(V)}} = 19.1 \text{mV/cycle}$$

Figure 6:
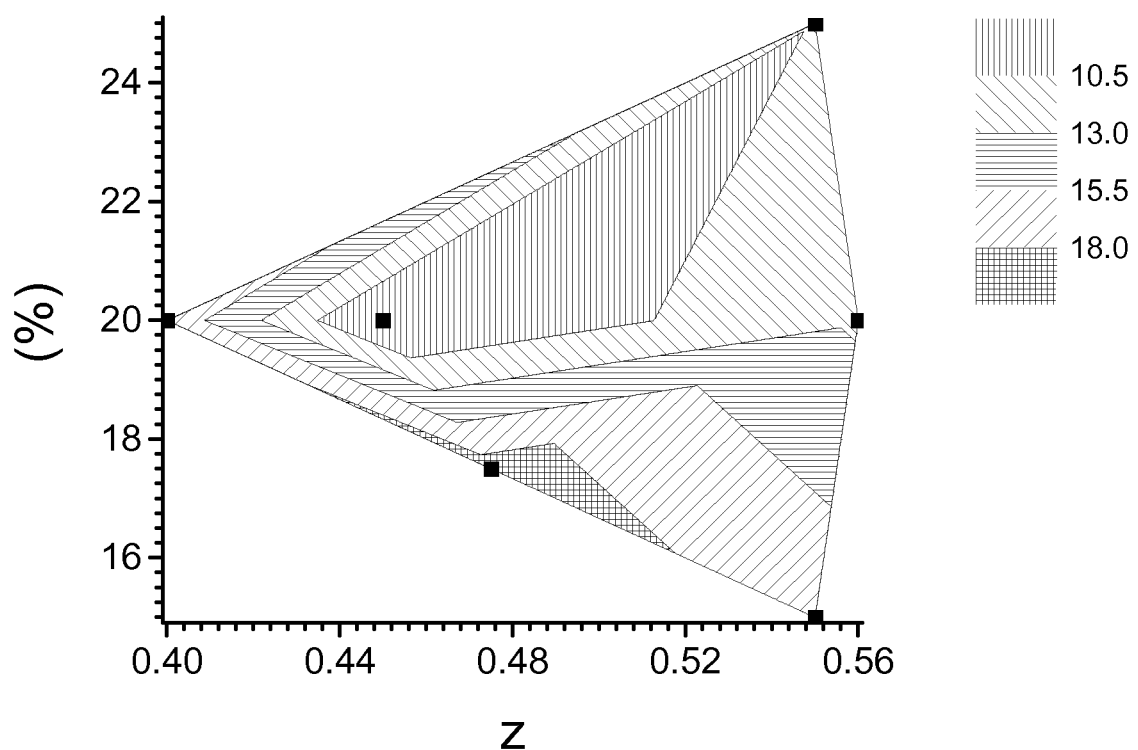
FIG. 6. Contour plot of slope results of NMC compounds in coin cell testing method 2

In FIG. 6, the values of slope (mV/cycle) are indicated by the shading in the different regions using commercial software Origin 9.1—contour plot. In this figure, the x-axis is for Ni-excess (z) and the y-axis is for the Co/M' content (mol/mol %) in the sample. As shown the figures, the samples that have a slope below about 16 mV have a composition with enhanced cycle stability. We observe that the slope gets worse as Ni-excess decreases, if the Ni-excess is below 0.42 and Co is below 0.18 or above 0.22 the slope is too large.

Figure 7:
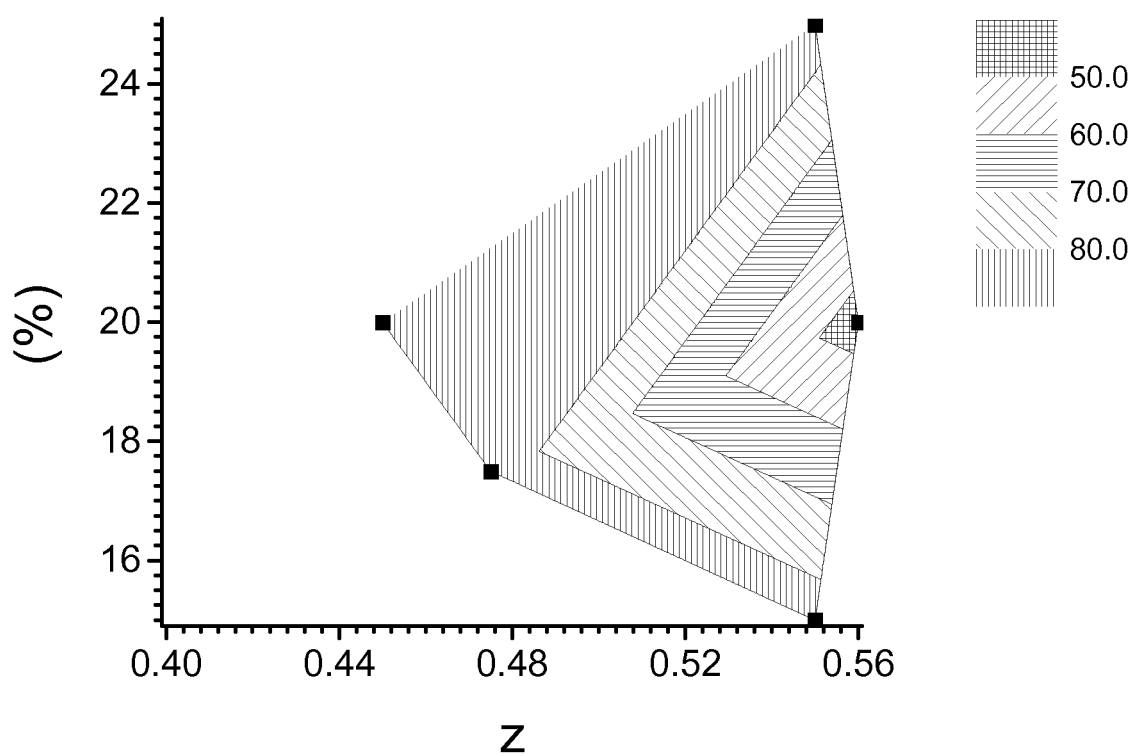
FIG. 7. Contour plot of recovered capacities of NMC compounds in coin cell testing method 3

Additionally, FIG. 7 shows the recovered capacity of the examples measured by "Testing Method 3". The values of R.Q. in % are indicated by the shading in the different regions using commercial Software Origin 9.1—contour plot. In this figure, the x-axis is for Ni-excess (z) and the y-axis is for the Co/M' content (mol/mol %). The samples that have a recovered capacity above about 70% have a composition having a good storage property at high temperature.

It can be concluded from FIGS. 3 to 7 that the best one of the optimized compositions is that of samples having a Co/M' content of 20 mol/mol % and z=0.45, as all the criteria described above are met by this composition.

Figure 8:
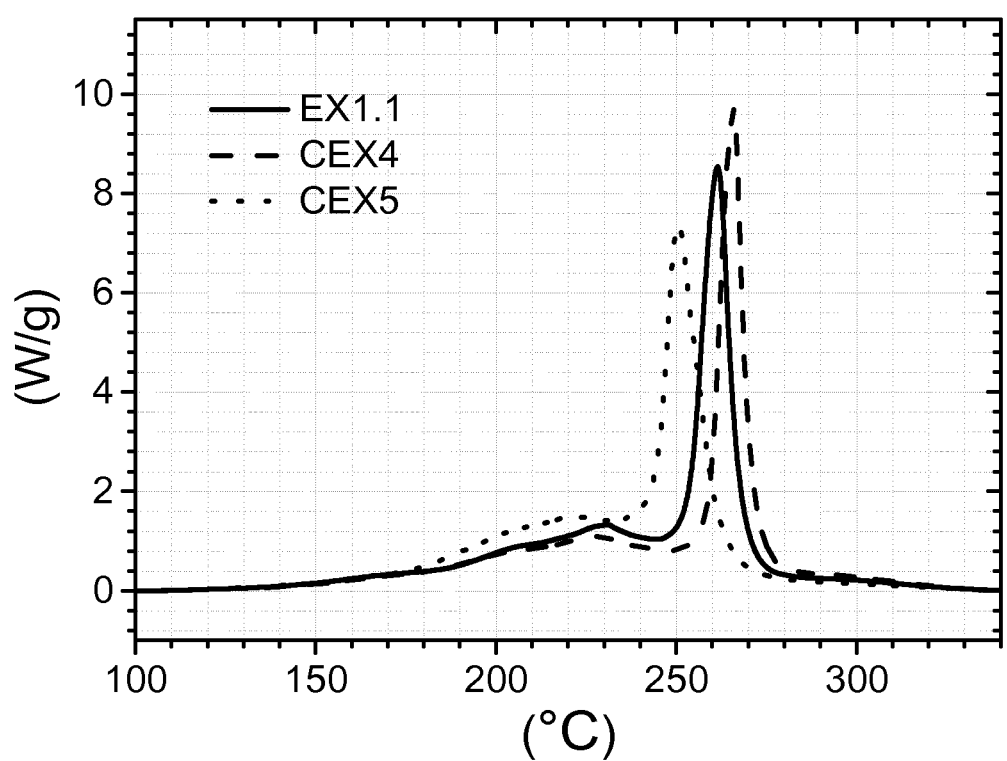
FIG. 8. DSC spectra of the NMC compounds

FIG. 8 shows the DSC spectra of EX1.1, CEX4 and CEX5. In this figure, the x-axis is for temperature (° C.) and the y-axis is for heat flow (W/g). The main exothermic peak, starting at about 180° C. and reaching a maximum at about 250° C. to 264° C., results from structural changes of the delithiated cathode, accompanied by oxygen release and subsequent combustion of the electrolyte by oxygen. Especially, as the Ni content in NMC increases, the temperature of the main peak continuously decreases and the evolved exothermic heat continuously increases, which indicates a worse safety. CEX5 with high Ni-excess (0.56) has a lower exothermic peak temperature and higher exothermic reaction enthalpy than the other examples. These examples show that as the Ni-excess increases the thermal stability of the charged cathode materials significantly deteriorates. Therefore, an increased capacity not only reduces the cycle stability but also reduces the safety. Accordingly, from these examples EX1.1 has an optimized composition with enhanced cell performances and high thermal stability.

To further identify the electrochemical properties of the samples of Example 1, NMC samples having various Li/M' ratio are investigated by "Testing method 1" and "Carbon Analysis". As described in Table 5, if the ratio of Li/M' is too high, such as CEX1, the reaction between the mixed transition metal source and the lithium source doesn't finish and results in unreacted and molten lithium sources. Therefore, the remaining lithium cause a large amount of carbon to exist in the final NMC product, and a low discharge capacity results.

On the other hand, if the ratio of Li/M' is too low, i.e. below 0.95, the lithium stoichiometry within the crystal structure is less than desired. XRD diffraction data (not shown here) allow to conclude that as a result of the low Li/M' more transition metals are located on lithium sites thus blocking the Li diffusion pathways. This causes a lower reversible capacity as well as poor cycle life. Therefore, the samples in EX1 with Li/M' of 0.95-1.05 have a specific composition with enhanced electrochemical performance, such as high capacity, good cycle stability and high thermal stability.

Figure 9:
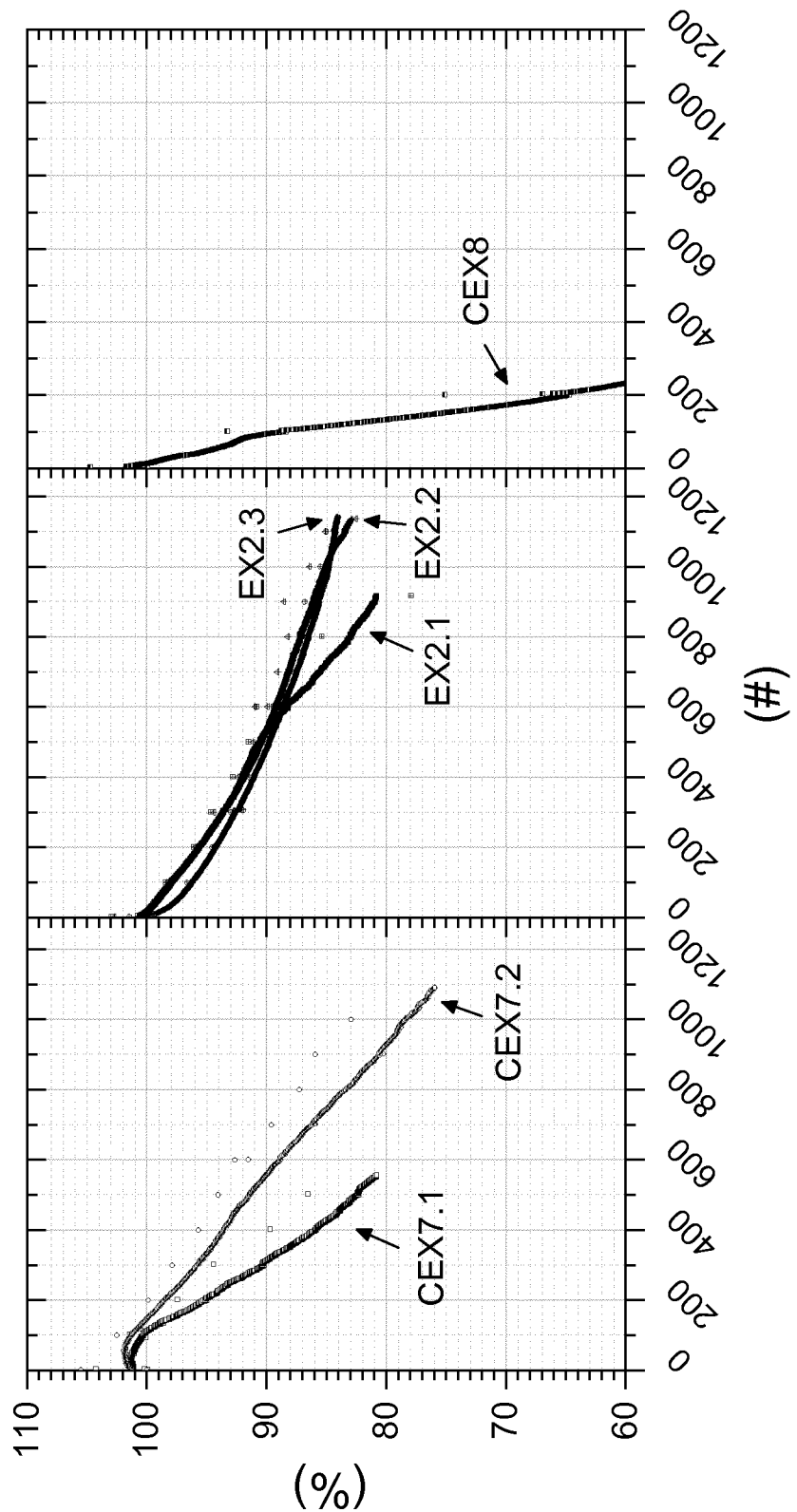
FIG. 9. Full cell cycle life test results, wherein x-axis is the number of cycles and y-axis is the relative discharge capacity.
Figure 10:
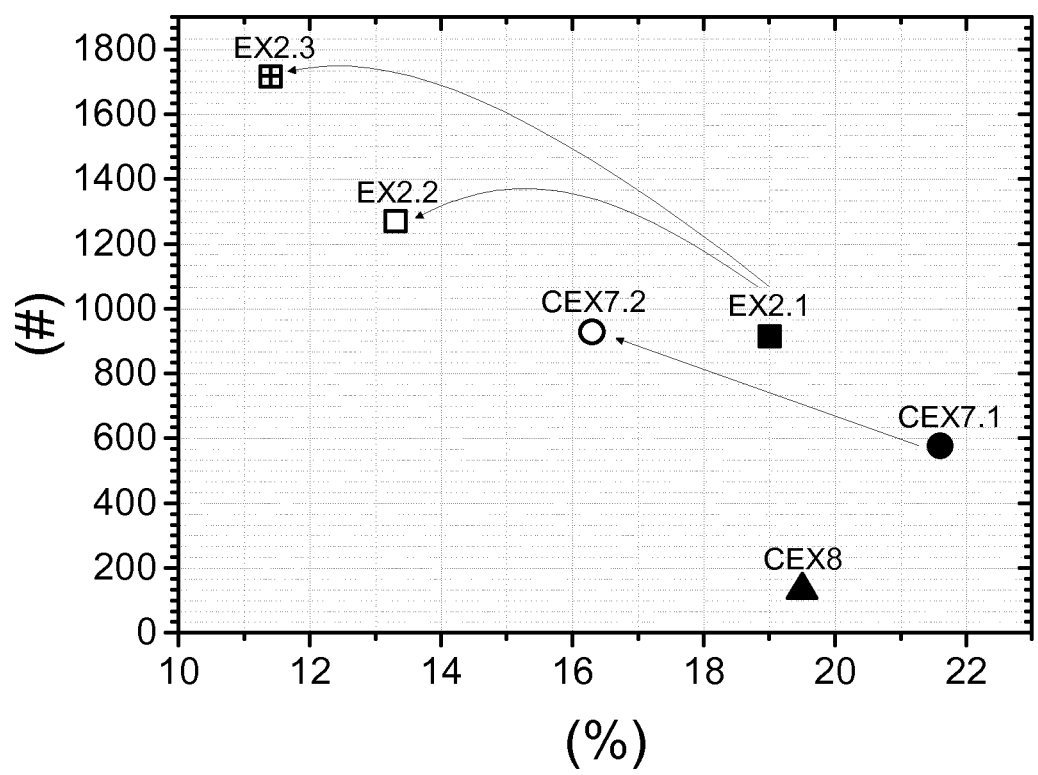
FIG. 10. Correlation between capacity fading from coin cell test method 1 and full cell cycle life.

EX2.1, CEX7.1, 7.2 and CEX8 were prepared at a scale using processes which are compatible with industrial production. The results of coin cell tests by the test method 1 and full cell tests (see FIG. 9) indicate that the above conclusion about the Ni-excess of around 0.45 being the best amongst the optimized NMC compositions is still valid in the industrial products. FIG. 9 and Table 6 further show that EX2.2—FC and EX2.3—FC have superior electrochemical properties, which indicates that the electrochemical performance can be further improved by surface modification technologies such as an aluminum coating. FIG. 10 shows the correlation between capacity fading (1C/1C QFad.) from coin cell test method 1 and full cell cycle life. The x-axis is the capacity fading (1C/1C QFad.) in %/100 cycles from coin cell test method 1 and the y-axis is the number of cycles at 80% of the initial full-cell discharge capacity. It indicates that the results from coin cell test method 1 can represent the electrochemical properties of real batteries.

TABLE 7

Properties of Examples

| Battery ID | Invention | Example ID | Electrolyte | Salt (wt %)[1] | Solvent (wt %)[1] | Additives (wt %)[1] | Full cell testing D2 25° C. 4.35 V # cycle at 80% of R.Q | Full cell testing D2 25° C. 4.35 V DCR increase after 500 cycles (%) | Full cell testing D3 45° C. 4.35 V # cycle at 80% of R.Q | Full cell testing D3 45° C. 4.35 V DCR increase after 500 cycles (%) | Bulging test D4 90° C. 4.35 V Expansion ratio (%) |
|---|---|---|---|---|---|---|---|---|---|---|---|
| EX3-FC1 | Yes | EX3 | EL2 | LiPF$_6$ (11.37%) | FEC (3.43%) PC (18.01%) DFEA (64.34%) | LIBOB (0.85%) ESa (1.50%) MA (0.50%) | 5675 | −3 | 1208 | +3 | 49 |
| CEX9-FC1 | No | CEX9 | | | | | 1515 | −12 | 763 | 0 | 41 |
| EX3-FC2 | No | EX3 | EL3 | LiPF$_6$ (14.71%) | EC (24.51%) EMC (28.43%) DEC (28.43%) VEC (1.47%) VC (1.47%) | LiPO$_2$F$_2$ (0.98%) | 1395 | +39 | 752 | +68 | 95 |
| CEX9-FC2 | No | CEX9 | | | | | 1508 | −4 | 455 | — | 91 |

[1] expressed in weight percent relative to the total weight of the composition

Table 7 shows that the best performance in terms of cycle life at 25° C. and 45° C. are obtained for the combination EX3 and EL2, which is EX3-FC1. These data show that the EX3-FC1 is an improvement compared to CEX9-FC1 as well as EL2 is an improvement compared to EL3. Nevertheless, it is really the combination of EX3 with EL2 that allows to reach the highest level of performance. This synergistic effect is also clearly noticeable in Table 7 with a net decrease of the DC resistance and expansion ratio at very high temperature. The fact that these values are even lower for EL2 combined with EX3 than for EL2+CEX9 indicates the need of synergy between the molecules that compose the electrolyte composition and the cathode material.

The invention claimed is:

1. A liquid electrolyte lithium secondary battery cell comprising:
a positive electrode material comprising a lithium transition metal-based oxide powder having a general formula
Li$_{1+a}$((Ni$_z$ (Ni$_{0.5}$Mn$_{0.5}$)$_y$ CO$_x$)$_{1-k}$ A$_k$)$_{1-a}$ O$_2$, wherein A is a dopant, −0.025≤a≤0.025, 0.18≤x≤0.22, 0.42≤z≤0.52, 1.075<z/y<1.625, x+y+z=1 and k<0.01; and
an electrolyte composition comprising:
a) at least one cyclic carbonate, wherein the at least one cyclic carbonate is propylene carbonate,
b) monofluoroethylene carbonate,
c) at least one fluorinated acyclic carboxylic acid ester, wherein the at least one fluorinated acyclic carboxylic acid ester is 2,2-difluoroethyl acetate,
d) at least one electrolyte salt, wherein the at least one electrolyte salt is lithium hexafluorophosphate (LiPFO),
e) at least one lithium compound, wherein the at least one lithium compound is lithium bis(oxalato)borate,
f) at least one cyclic sulfur compound, wherein the at least one cyclic sulfur compound is 1,3,2-dioxathiolane 2,2-dioxide, and
g) at least one cyclic carboxylic acid anhydride, wherein the at least one cyclic carboxylic acid anhydride is maleic anhydride.

2. The liquid electrolyte lithium secondary battery cell according to claim 1, wherein the lithium transition metal-based oxide powder has a carbon content ≤1000 ppm.

3. The liquid electrolyte lithium secondary battery cell according to claim 1, wherein the lithium transition metal-based oxide powder has a carbon content ≤400 ppm.

4. The liquid electrolyte lithium secondary battery cell of claim 1, wherein the lithium transition metal-based oxide powder has a sulfur content between 0.05 and 1.0 wt %.

5. The liquid electrolyte lithium secondary battery cell of claim 1, wherein the lithium transition metal-based oxide powder further comprises between 0.15 and 5 wt % of a LiNaSO$_4$ secondary phase.

6. The liquid electrolyte lithium secondary battery cell of claim 5, wherein the lithium transition metal-based oxide powder comprises a core comprising a lithium transition metal-based oxide and a coating comprising the LiNaSO$_4$ secondary phase.

7. The liquid electrolyte lithium secondary battery cell of claim 5, wherein the LiNaSO$_4$ secondary phase further comprises up to 1 wt % of one or more of Al$_2$O$_3$, LiAlO$_2$, LiF, Li$_3$PO$_4$, MgO or Li$_2$TiO$_3$.

8. The liquid electrolyte lithium secondary battery cell of claim 1, wherein the lithium transition metal-based oxide powder comprises a core comprising a lithium transition metal-based oxide and a surface layer comprising lithium and transition metals, the surface layer being delimited by an outer and an inner interface, the inner interface being in contact with the core, wherein the dopant A comprises Al, wherein the core has an Al content of 0.3-3 mol %, and wherein the surface layer has an Al content that increases from the Al content of the core at the inner interface to at least 10 mol % at the outer interface, the Al content being determined by XPS.

9. The liquid electrolyte lithium secondary battery cell of claim 1, wherein the electrolyte composition comprises:
  from 15% to 35% propylene carbonate,
  from 30% to 70% 2,2-difluoroethyl acetate,
  from 9% to 16% lithium hexafluorophosphate ($LiPF_6$),
  from 0.4% to 2% lithium bis(oxalato)borate,
  from 0.4% to 5% 1,3,2-dioxathiolane 2,2-dioxide, and
  from 0.25% to 1% maleic anhydride.

* * * * *